United States Patent
Zinn et al.

(10) Patent No.: US 7,168,949 B2
(45) Date of Patent: Jan. 30, 2007

(54) STAGNATION POINT REVERSE FLOW COMBUSTOR FOR A COMBUSTION SYSTEM

(75) Inventors: Ben T. Zinn, Atlanta, GA (US); Yedidia Neumeier, Scarsdale, NY (US); Jerry M. Seitzman, Atlanta, GA (US); Jechiel Jagoda, Atlanta, GA (US); Ben-Ami Hashmonay, Misgav (IL)

(73) Assignee: Georgia Tech Research Center, Atlanta, GA (US)

( * ) Notice: Subject to any disclaimer, the term of this patent is extended or adjusted under 35 U.S.C. 154(b) by 0 days.

(21) Appl. No.: 11/127,038

(22) Filed: May 11, 2005

(65) Prior Publication Data
US 2006/0029894 A1 Feb. 9, 2006

Related U.S. Application Data

(63) Continuation-in-part of application No. 10/927,205, filed on Aug. 26, 2004.
(60) Provisional application No. 60/578,554, filed on Jun. 10, 2004.

(51) Int. Cl.
*F23D 14/46* (2006.01)
*F02C 1/00* (2006.01)
*F23R 3/58* (2006.01)
(52) U.S. Cl. .................. 431/350; 431/116; 431/354
(58) Field of Classification Search ............ 431/8, 431/9, 115, 116, 159, 171, 215, 243, 350, 431/351, 353, 354; 60/752, 755–758, 760
See application file for complete search history.

(56) References Cited

U.S. PATENT DOCUMENTS

| 331,261 | A | * | 11/1885 | Stuertz | ............... 431/215 |
| 429,308 | A | * | 6/1890 | Westphal | ............... 74/390 |
| 435,670 | A | * | 9/1890 | Stellwag | ............... 431/215 |
| 792,542 | A | * | 6/1905 | Williams | ............... 47/11 |

(Continued)

FOREIGN PATENT DOCUMENTS

EP 0698764 2/1996

(Continued)

OTHER PUBLICATIONS

"Laseroptical Investigation of Highly Preheated Combustion with Strong Exhaust Gas Recirculation;"Twenty-Seventh Symposium (International) on Combustion/The Combustion Institute, Aug. 1998, pp. 3197-3204; Tobias Plessing, Norbert Peters, and Joachim G. Wunning.

(Continued)

Primary Examiner—Josiah C. Cocks
(74) Attorney, Agent, or Firm—Troutman Sanders LLP; Gerald R. Boss

(57) ABSTRACT

A combustor assembly includes a combustor vessel having a wall, a proximate end defining an opening and a closed distal end opposite said proximate end. A manifold is carried by the proximate end. The manifold defines a combustion products exit. The combustion products exit being axially aligned with a portion of the closed distal end. A plurality of combustible reactant ports is carried by the manifold for directing combustible reactants into the combustion vessel from the region of the proximate end towards the closed distal end.

7 Claims, 21 Drawing Sheets

U.S. PATENT DOCUMENTS

| | | | |
|---|---|---|---|
| 1,614,085 A * | 1/1927 | Runyan | 432/159 |
| 2,876,831 A * | 3/1959 | Knight | 431/158 |
| 3,096,812 A * | 7/1963 | Kervin | 431/158 |
| 3,285,840 A | 11/1966 | Lindemann | |
| 3,309,866 A | 3/1967 | Kydd | |
| 3,407,596 A * | 10/1968 | Dasbach et al. | 60/737 |
| 3,843,307 A | 10/1974 | Staudinger | |
| 4,040,252 A * | 8/1977 | Mosier et al. | 60/804 |
| 4,298,333 A | 11/1981 | Wunning | |
| 4,306,858 A | 12/1981 | Simon | |
| 4,549,402 A | 10/1985 | Saintsbury et al. | |
| 4,586,894 A | 5/1986 | Wunning | |
| 4,877,396 A | 10/1989 | Wunning | |
| 5,044,932 A | 9/1991 | Martin et al. | |
| 5,154,599 A | 10/1992 | Wunning | |
| 5,203,690 A * | 4/1993 | Maruko | 431/236 |
| 5,255,742 A | 10/1993 | Mikus | |
| 5,404,952 A | 4/1995 | Vinegar et al. | |
| 5,501,162 A * | 3/1996 | Kravets | 110/347 |
| 5,515,680 A | 5/1996 | Fujimura et al. | |
| 5,570,679 A | 11/1996 | Wunning | |
| 5,862,858 A | 1/1999 | Wellington et al. | |
| 5,899,269 A | 5/1999 | Wellington et al. | |
| 6,019,172 A | 2/2000 | Wellington et al. | |
| 6,033,207 A | 3/2000 | Cummings | |
| 6,042,371 A * | 3/2000 | Mitani et al. | 432/179 |
| 6,082,111 A | 7/2000 | Stokes | |
| 6,269,882 B1 | 8/2001 | Wellington et al. | |
| 6,321,743 B1 * | 11/2001 | Khinkis et al. | 126/91 A |
| 6,345,495 B1 | 2/2002 | Cummings | |
| 6,485,289 B1 * | 11/2002 | Kelly et al. | 431/4 |
| 6,599,119 B1 | 7/2003 | Wood et al. | |
| 6,752,620 B2 | 6/2004 | Heier et al. | |
| 6,796,789 B1 | 9/2004 | Gibson et al. | |
| 2002/0069648 A1 | 6/2002 | Levy et al. | |
| 2002/0181245 A1 | 12/2002 | Futschik et al. | |

FOREIGN PATENT DOCUMENTS

| | | |
|---|---|---|
| EP | 0725251 | 8/1996 |
| EP | 1355 111 | 10/2003 |
| GB | 100072 | 4/1917 |
| GB | 997420 | 7/1965 |
| GB | 1065282 | 4/1967 |
| GB | 1146400 | 3/1969 |
| JP | 2003279001 A * | 10/2003 |
| NZ | 503462 | 9/2001 |
| WO | WO 03/091626 | 11/2003 |

OTHER PUBLICATIONS

"Nox Behavior in Lean-Premixed Combustion;" Twenty-Seventh Symposium (International) on Combustion, Presented at the University of Colorado at Boulder; Aug. 1998, pp. 1-11; Teodora Rutar Shuman, David G. Nicol, John C.Y. Lee and Philip C. Malte.

* cited by examiner

STAGNATION POINT REVERSE FLOW COMBUSTOR FOR A COMBUSTION SYSTEM

BENEFIT CLAIMS TO PRIOR APPLICATIONS

This application claims the benefit of U.S. Provisional Application No. 60/578,554 filed on Jun. 10, 2004 and is a continuation in part of U.S. Utility application Ser. No. 10/927,205 filed on Aug. 26, 2004.

GOVERNMENT INTERESTS

This invention was made in part during work supported by the U.S. Government, including grants from the National Aeronautics and Space Administration (NASA), #NCC3-982. The government may have certain rights in the invention.

FIELD OF THE INVENTION

This invention relates to a combustion system in general and more particularly to a combustion system which utilizes a combustion chamber design for low pollutant emissions by creating a stagnation region for anchoring a flame and reverse flow of combustion products that partially mixes with the incoming reactants.

BACKGROUND

Combustion and its control are essential features to everyday life. Approximately eighty-five percent of the energy used in the United States alone is derived via combustion processes. Combustion of combustible resources is utilized for, among other things, transportation, heat and power. However, with the prevalent occurrences of combustion, one of the major downsides of these processes is environmental pollution. In particular, the major pollutants produced are nitrogen oxides (NOx), carbon monoxide (CO), unburned hydrocarbons (UHC), soot and sulfur dioxides. Emissions of NOx in particular, have exceeded over twenty-five million short tons in preceding years. Such pollutants have raised public concerns.

In response to public concerns, governments have initiated laws regulating the emission of pollutants. As a result, current combustion systems must efficiently convert the fuel energy into thermal energy with low emissions of NOx, CO, UHC, and soot.

To burn, the fuel must first mix with an oxidant such as air. The resulting mixture must then be supplied with sufficient heat and, if possible, free radicals, which are highly reactive chemical species such as H, OH and O, to ignite. Once ignition occurs, combustion is generally completed within a very short time period. After initial ignition, combustion proceeds via an internal feedback process that ignites the incoming reactants by bringing them into contact within the combustor with hot combustion products and, on occasion, with reactive gas pockets produced by previously injected reactants.

To maintain the flame in the combustor, it must be anchored in a region where the velocity of the incoming reactants flow is low. Low velocities, or long residence times, allow the reactants sufficient time to ignite. In the well known Bunsen burner, the flame is anchored near the burner's rim and the required feedback is accomplished by molecular conduction of heat and molecular diffusion of radicals from the flame into the approaching stream of reactants. In gas turbines, the flame anchoring and required feedback are typically accomplished by use of one or more swirlers that create recirculation regions of low velocities for anchoring the flame and back flow of hot combustion products and reacting pockets that ignites the incoming reactants. In ramjets and afterburners, this is accomplished by inserting bluff bodies, such as a V-shaped gutter, into the combustor to generate regions of low flow velocities and recirculation of hot combustion pockets and reacting gas pockets to anchor the flame and ignite the reactants.

More recently, in an effort to reduce NOx emissions in industrial processes, the use of high velocity fuel and air jets to attain what is referred to as flameless combustion has been advocated. U.S. Pat. No. 5,570,679 discloses a flameless combustion system. In the '679 patent, an impulse burner is disclosed. Fuel and air jets that are spatially separated by specified distances are injected into the combustor or process with high velocities. The system incorporates two separate operating states. In the first state, the burner is first switched such that a first fuel valve is opened and a second fuel valve is closed. The fuel and oxidant are mixed in a combustion chamber and ignited with stable flame development and the flame gases emerge through an outlet opening in the combustion chamber to heat up the furnace chamber. As soon as the furnace chamber is heated to the ignition temperature of the fuel, a control unit switches the burner over to a second operating state by closing of the first fuel valve and opening a second fuel valve. In this second operating state, no fuel is introduced into the combustion chamber and as a consequence, the burning of the fuel in a flame in the combustion chamber is essentially suppressed entirely. The fuel is fed into the furnace chamber exclusively.

Because of their high momentum, the incoming fuel and oxidant jets act as pumps entraining large quantities of hot combustion products within the furnace chamber. Since the furnace chamber has been heated up to the ignition temperature of the fuel, the reaction of the fuel with the combustion oxidant takes place in a distributed combustion process along the vessel without a discernible flame. Consequently, this process has been referred to as flameless combustion or flameless oxidation. Since this process requires that the incoming reactants jets mix with large quantities of hot products, its combustion intensity, i.e., amount of fuel burned per unit volume per second, is low. Also, the system requires high flow velocity of the fuel jets to create the pump action necessary for mixing the fuel with the hot combustion products. Additionally, since a significant fraction of the large kinetic energy of the injected reactants jets is dissipated within the furnace, the process experiences large pressure losses. Consequently, in its current design, this process is not suitable for application to land-based gas turbines and aircraft engine's combustors and other processes which require high combustion intensity and/or low pressure losses.

In another combustion system, often referred to as well stirred or jet stirred combustor, fuel and oxidant are mixed upstream of the combustion chamber and the resulting combustible mixture is injected via one or more high velocity jets into a relatively small combustor volume. The high momentum of the incoming jets produces very fast mixing of the incoming reactants with the hot combustion products and burning gases within the combustor, resulting in a very rapid ignition and combustion of the reactants in a combustion process that is nearly uniformly distributed throughout the combustor volume.

Generally, existing combustion systems minimize NOx emissions by keeping the temperatures throughout the combustor volume as low as possible. A maximum target temperature is approximately 1800K, which is the threshold above which thermal NOx starts forming via the Zeldovich mechanism. Another requirement for minimizing NOx formation is that the residence time of the reacting species and combustion products in high temperature regions, where NOx is readily formed, be minimized. On the other hand, temperatures and the residence times of the reacting gases and hot combustion products inside these combustors must be high enough to completely burn the fuel and keep the emissions of CO, UHC, and soot below government limits.

Gas turbine systems are known to include a compressor for compressing air; a combustor for producing a hot gas by reacting the fuel with the compressed air provided by the compressor, and a turbine for expanding the hot gas to extract shaft power. The combustion process in many older gas turbine engines is dominated by diffusion flames burning at or near stoichiometric conditions with flame temperatures exceeding 3,000 degrees F. Past the combustion zone and prior to the turbine inlet the hot gases are diluted by extra "cold" air from the compressor discharge to limit the turbine inlet temperature to a permissible level. Such combustion will produce a high level of oxides of nitrogen (NOx). Current emissions regulations have greatly reduced the allowable levels of NOx emissions. Lean premixed combustion has been developed to reduce the peak flame temperatures and to correspondingly reduce the production of NOx in gas turbine engines. In a premixed combustion process, fuel and air are premixed in a premixing section upstream of the combustor. The fuel-air mixture is then introduced into a combustion chamber where it is burned. U.S. Pat. No. 6,082,111 describes a gas turbine engine utilizing a can annular premix combustor design. Multiple premixers are positioned in a ring to provide a premixed fuel/air mixture to a combustion chamber. A pilot fuel nozzle is located at the center of the ring to provide a flow of pilot fuel to the combustion chamber.

The design of a gas turbine combustor is complicated by the necessity for the gas turbine engine to operate reliably with a low level of emissions at a variety of power levels. High power operation tends to increase the generation of oxides of nitrogen. Low power operation at lower combustion temperatures tends to increase the generation of carbon monoxide and unburned hydrocarbons due to incomplete combustion of the fuel. Under all operating conditions, it is important to ensure the stability of the flame to avoid unexpected flameout, damaging levels of acoustic vibrations, and damaging flashback of the flame from the combustion chamber into the fuel premix section upstream of the combustor. A relatively rich fuel/air mixture will improve the stability of the combustion process but will have an adverse affect on the level of emissions. A careful balance must be achieved among these various constraints in order to provide a reliable machine capable of satisfying very strict contemporary and future emissions regulations.

With respect to gas turbines, FIG. 9 illustrates a schematic diagram of a typical gas turbine system 80. A compressor 82 draws in ambient air 84 and delivers compressed air 86 to a combustor 88. A fuel supply 90 delivers fuel 92 to combustor 88 where it reacts with the compressed air to produce high temperature combustion gas 94. The combustion gas 94 is expanded through a turbine 96 to produce shaft horsepower driving shaft 95 for driving compressor 82 and a load such as an electrical generator 98. Gas turbines having an annular combustion chamber exist including a plurality of burners disposed in one or more concentric rings for providing fuel into a single toroidal annulus. U.S. Pat. No. 5,400,587 describes one such annular combustion chamber design.

With respect to gas turbines for jet engines, FIG. 10 illustrates a prior art LM6000 engine commercially available from General Electric Aircraft Engines, Cincinnati, Ohio. Gas turbine engine 100 includes a low pressure compressor 102, a high pressure compressor 104, and a combustor 106. Engine 100 also includes a high pressure turbine 108 and a low pressure turbine 110. Compressor 102 and turbine 110 are coupled by a first shaft 112, and compressor 104 and turbine 108 are coupled by a second shaft 114. Engine 100 also includes a center longitudinal axis of symmetry 116 extending there through.

For jet engine design, there are historically three types of combustion chambers. There are multiple chambers, the turbo-annular chamber, and the annular chamber. These designs utilize a combustion chamber which has an inlet for receiving compressed air in the proximity of the compressor and a gas discharge at the opposite end in the proximity of the turbine. In operation, air flows through the low pressure compressor and compressed air is supplied from the low pressure compressor to the high pressure compressor. The highly compressed air is delivered to the combustor on the compressor side of the system. Gas flow from the combustor drives the turbines and exits the gas turbine engine through a nozzle.

As gas turbines and jet engines employ combustion systems, there is a need to develop a simple combustion system which produces low NOx emissions while being used in gas turbines and jet engine systems. In addition to gas turbine generators and jet engines, combustors are also utilized for industrial boilers to assist in generating steam to produce electricity and the like. Also, combustors are utilized in domestic and industrial heating processes such as water and air heating and material drying.

A primary problem with most combustion systems as mentioned above is the generation of pollutants such as NOx among others during the combustion of the fuel and air. This results because of the stoichiometry of the reacting fuel and oxidant streams. The stoichiometric quantity of an oxidizer is just that amount needed to completely burn the quantity of fuel. If more than a stoichiometric quantity of oxidizer is supplied, the mixture is said to be fuel lean, while supplying less than the stoichiometric oxidizer results in a fuel-rich mixture. The equivalence ratio is commonly used to indicate if the mixture is rich or lean. Typically to produce low NOx, the combustion is run fuel-lean. This requires a larger quantity of oxidant to be present and typically the utilization of swirlers to mix the fuel and the air prior to combustion. A typical combustion process is configured along an axis with the oxidant and fuel mixed upstream of a flame with combustion products exiting the combustor downstream from the flame. While suitable for their intended purposes, such systems utilize complicated structures to mix the air and fuel and are not always effective in their mixing. Furthermore, reducing the oxidants generally results in higher combustion process temperatures which produce higher NOx emissions.

The object of the invention is to create a simple and low cost combustion system that uses its geometrical configuration to attain complete combustion of fuels over a wide range of fuel flow rates, while generating low emissions of NOx, CO, UHC and soot.

Another object of the invented combustion system is to provide means for complete combustion of gaseous and liquid fuels when burned in premixed and non-premixed modes of combustion with comparable low emissions of NOx, CO, UHC and soot.

Another object of this invention is to provide capabilities for producing a robust combustion process that does not excite detrimental combustion instabilities in the combustion system when it burns fuels in premixed and non-premixed modes of combustion.

Another object of this invention is to use the geometrical arrangement of the combustion system to establish the feedback between incoming reactants and out flowing hot combustion products that ignites the reactants over a wide range of fuel flow rates while keeping emissions of NOx, CO, UHC and soot below mandated government limits.

SUMMARY OF THE INVENTION

A method for combusting reactants includes providing a vessel having an opening near a proximate end and a closed distal end defining a combustion chamber. Combustible reactants are presented into the combustion chamber. The combustible reactants are ignited creating a flame and combustion products. The closed end of the combustion chamber is utilized for directing combustion products toward the opening of the combustion chamber creating a reverse flow of combustion products within the combustion chamber. The reverse flow of combustion products is intermixed with the incoming flow of combustible reactants to maintain the flame.

BRIEF DESCRIPTION OF THE DRAWINGS

The methods and systemss designed to carry out the invention will hereinafter be described, together with other features thereof.

The invention will be more readily understood from a reading of the following specification and by reference to the accompanying drawings forming a part thereof.

DESCRIPTION OF THE PREFERRED EMBODIMENT

Referring now in more detail to the drawings, the invention will now be described in more detail.

Figure 1A:
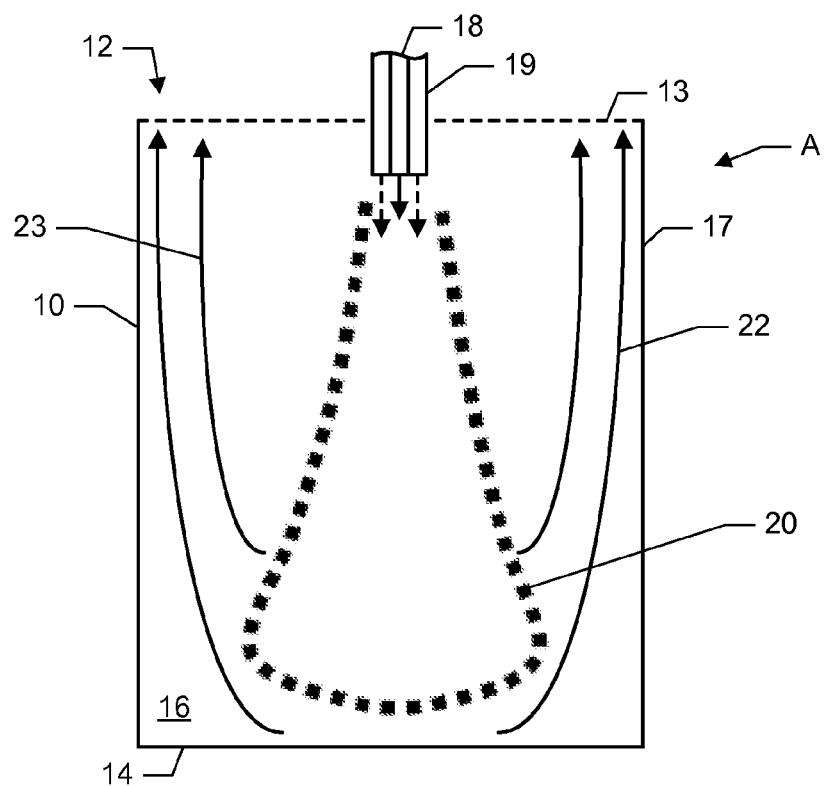
FIG. 1A illustrates a prospective view of a combustion method utilizing a non-premixed fuel supply according to the present invention.

As shown in FIG. 1A, a system and method of combusting are disclosed. Combustion system A includes a vessel 10 which has a proximate end 12 and a distal closed end 14 defining a combustion chamber 16. Proximate end 12 may define opening 13. Also, opening 13 may be located near proximate end 12 in either sidewall 17. A fuel supply 18 and oxidant supply 19 are provided into the combustion chamber for combustion. An igniter (not shown) ignites the reactants creating a flame 20 and combustion products 22. Due to the geometry of combustion chamber 16, the incoming reactants flow, which initially flows toward the distal closed end, is reversed and the combustion products flow 22 and 23 exit via opening 13.

Figure 2A:
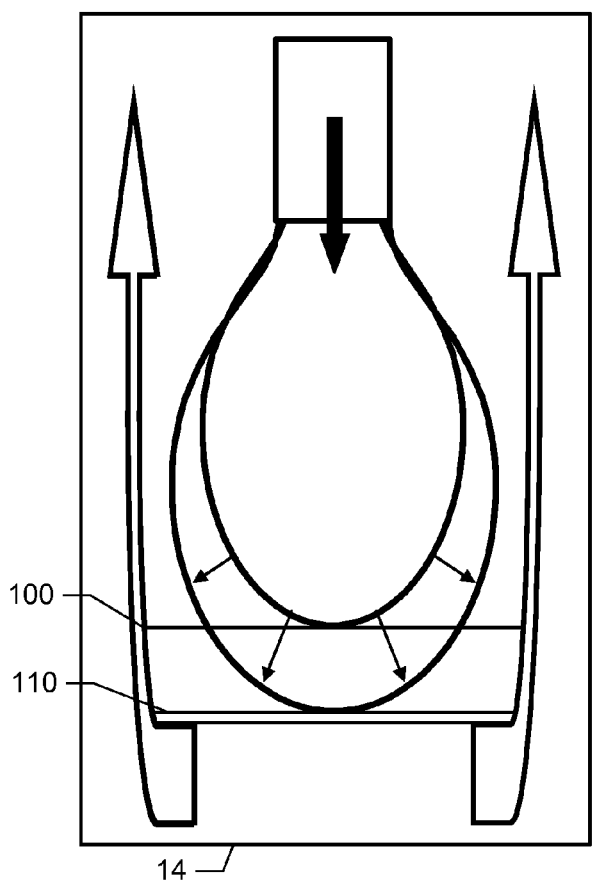
FIGS. 2A and 2B illustrate various flame shapes developed according to the present invention.
Figure 2B:
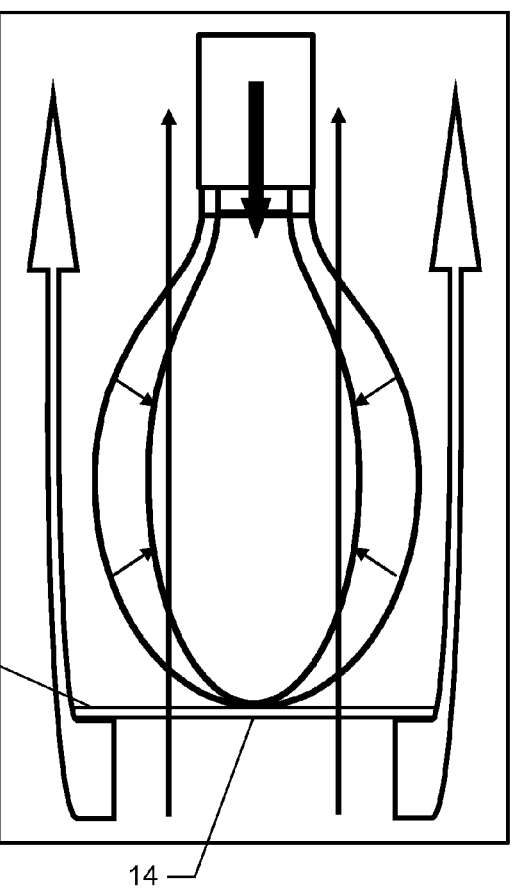

FIGS. 2A and 2B illustrate the adaptability of the combustion system A. As shown in FIG. 2A, the downstream end of the flame may be established at different locations within the stagnation zone utilizing the combustion chamber design having a distal closed wall and sidewalls when operated with different reactants flow rates. For a first operating condition having a predetermined flow rate, the downstream end of the flame may be at location A. For another operating condition utilizing a higher flow rate of reactants, the downstream end of the flame may be stabilized at location B which is closer to the combustion chamber endwall than for the lower flow rate reactants. As FIG. 2A illustrates, the downstream end of the flame stabilizes itself within the proximity of the stagnation zone near the distal end wall where the velocity of the incoming reactants flow is low. As shown in FIG. 2B, the shape of the stabilized flame varies as the equivalence ratio of the reactants changes and a stable flame is attained at different reactants equivalence ratios.

The stagnation zone acts to produce the low velocity, long residence time conditions that are conducive to stabilizing the flame under a wide range of fuel flow rates and equivalence ratios. Thus, even at high inlet velocities, the stagnation region is distinguished by low local velocities. Similarly the flame remains stable even for very low equivalence ratios.

As shown in FIG. 1A, one embodiment of the system is for a non-premixed combustion system. In a non-premixed combustion system, fuel and oxidant are provided separately into the combustion chamber and mixed within the combustion chamber. In the preferred embodiment, a fuel jet 18 provides fuel via a central stream. Adjacent the central fuel jet is an oxidant jet 19. In the preferred embodiment, oxidant jet 19 is annular which surrounds the central fuel jet. However, various oxidant jet configurations may be had which provide for a flow of oxidant to encircle the fuel flow. The fuel and oxidant are mixed within the combustion chamber to provide a combustible reactants mixture. As shown in FIG. 1A, the jets have their outlets aligned to prevent any pre-mixing and are preferably axially aligned with vessel 10. These jets may be located within the combustion chamber or in a close proximity outside of the combustion chamber. The combustible reactants are capable of being injected into the combustion chamber at different rates via a nozzle, and the combustion process may have a turndown ratio of at least 1.5 and can be greater.

Figure 1B:
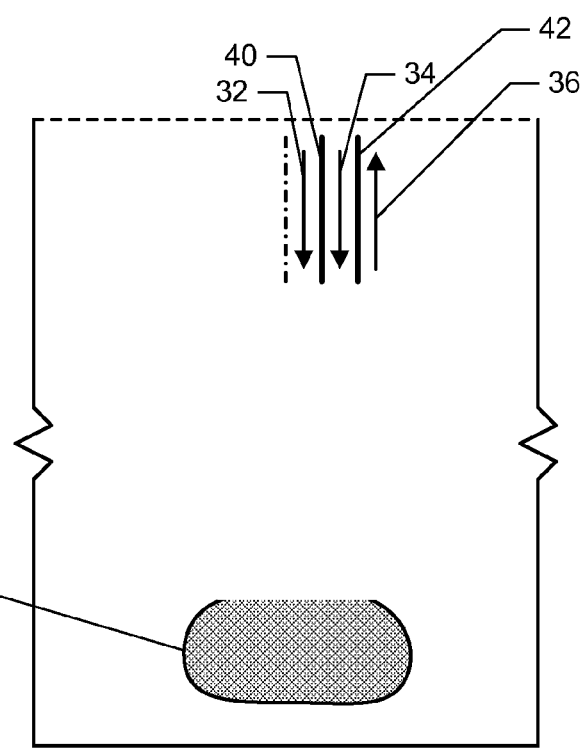
FIG. 1B illustrates a schematic of fluid flows within the method shown in FIG. 1A.

As shown in FIG. 1B, the separate fuel and oxidant flows interact within the combustion chamber. As fuel flow 32 flows toward the end wall of the combustion chamber, it interacts with oxidant flow 34, which is also flowing toward the end wall of the combustion chamber. The interaction of the fuel and oxidant flows creates an inner shear layer 40. While this is occurring, combustion products and burning gas pockets flow 36 is flowing toward the open end of the combustion chamber away from the distal end of the combustion chamber. The combustion product and burning gas pockets flow 36 is simultaneously interacting with the downward oxidant flow 34 creating a second, outer shear layer 42. The oncoming reactants flows are also slowed down as they approach the closed end wall of the combustion chamber, producing a stagnation flow zone 38 near the end wall.

In the outer shear layer 42, the oxidant mixes with the hot products and in the inner shear layer, the oxidant mixes with the fuel. Since the outer shear layer is located between two counter flowing streams, the mixing inside this shear layer is much more intense than the mixing within the inner shear layer that involves mixing between fuel and oxidant streams that move in the same direction. The resulting streams of fuel-oxidant and oxidant-hot combustion products and burning gas pockets that form in the inner and outer shear layers, respectively, come into contact and burn in a manner similar to a premixed mode of combustion, which produces low NOx emissions when the equivalence ratio of the reactants mixture is low. Thus, this mixing between the incoming reactants and out flowing hot products and reacting gas pockets establishes the feedback of heat and radicals needed to attain ignition over a wide range of fuel flow rates. Since the presence of radicals in a mixture of reactants lowers its ignition temperature, some of the fuel ignites and burns at lower than normal temperatures, which can lead to a reduced amount of NOx generated in this combustion system.

The intensity of mixing in the shear layers between the incoming reactants and out flowing hot combustion products and burning gas pockets generally controls the ignition and rate of consumption of the fuel. Specifically, an increase in the mixing intensity within these shear layers accelerates ignition and the rate of consumption of the fuel. Since in this invention the velocities of the co- and counter-flowing streams on both sides of the shear layers increase as the fuel supply rate to the combustion chamber increases, the intensity of the mixing rates inside the shear layers increases as more reactants are burned inside the combustor, thus accelerating the ignition and combustion of the reactants. Consequently, since the rates of the processes that consume the reactants automatically increase in this invention as the reactants injection rates into the combustion chamber increase, the invented combustion system can operate effectively over a wide range of reactants supply rates, and thus power levels. It also follows that the invented combustion chamber can burn reactants efficiently at rates needed for a wide range of applications, including land based gas turbines, aircraft engines, water and space heaters, and energy intensive industrial processes such as aluminum melting and drying.

In the embodiment of FIG. 1A, as the hot gases leave the combustion chamber, they move around the pipes that supply the cold reactants into the combustor. This contact transfers heat from the hot combustion products into the reactants stream, thus increasing the temperature of the reactants prior to their injection into the combustor. This, in turn, reduces the time required to burn the fuel or allows the combustion of leaner mixtures.

Figure 3A:
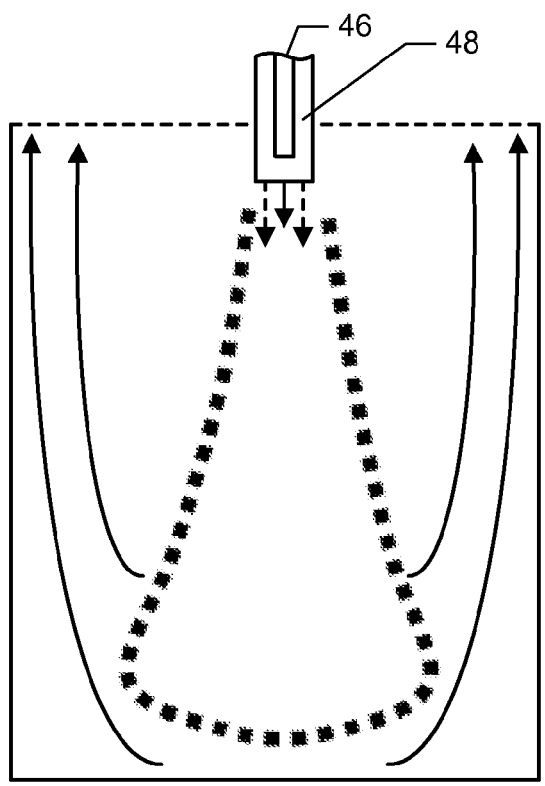
FIG. 3A illustrates a prospective view of a combustion method utilizing a premixed fuel supply according to the present invention.
Figure 3B:
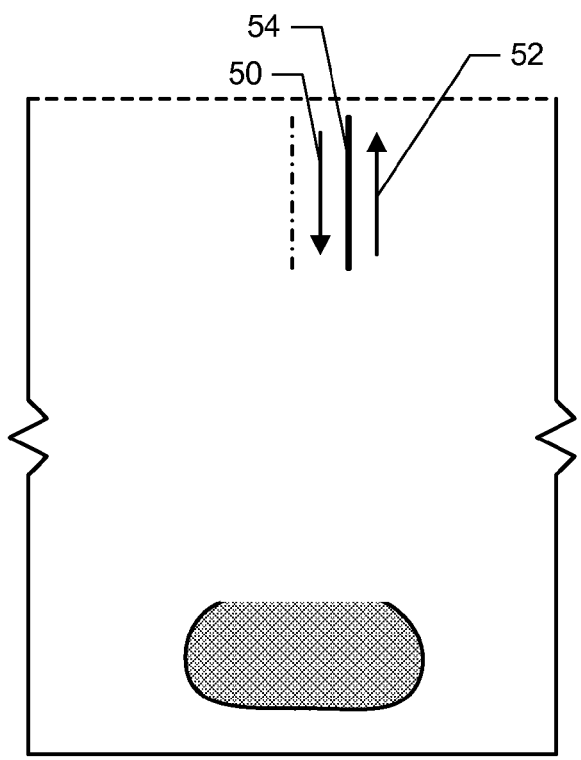
FIG. 3B illustrates a schematic of fluid flows within the method shown in FIG. 3A.

FIGS. 3A and 3B illustrate the operation of the combustion invention in a premixed combustion mode. As shown in FIG. 3A, the system is generally the same as that for the non premixed system described with respect to FIG. 1A, except that the fuel jet 46 is positioned to provide for the fuel to mix with the oxidant flow 48 prior to entering into the combustion chamber. As shown in FIG. 3B, the premixed reactants flow 50 interacts with counter flowing combustion products flow 52 to establish only one shear layer 54 between the counter flowing streams. The injected combustible mixture is ignited in the shear layer 54 at its outer boundary where it mixes with hot combustion products and radicals supplied by the stream of gases flowing in the opposite direction out of the combustion chamber. As the flow of reactants decelerates as it approaches the closed end of the combustion chamber, the rate of mixing between the reactants and hot products and reacting gas pockets is increased by the formation of vortices in the flow. This, in turn, causes a larger fraction of reactants to ignite and burn as the flow approaches the closed end of the combustion chamber.

The invented combustion system can also burn liquid fuels in premixed and non premixed modes of combustion. When burned in a premixed mode, the liquid fuel is first prevaporized and then premixed with the oxidant to form a combustible mixture that is then injected into the combustion chamber. The resulting mixture is then burned in a manner similar to that in which a combustible gaseous fuel-oxidant mixture is burned in a premixed mode, as described in the above paragraphs. When the liquid fuel is burned in a non premixed mode, the fuel is injected separately into the combustor through an orifice aligned with the axis of the combustion chamber and the combustion oxidant is injected in through an annular orifice surrounding the fuel orifice in the manner similar to that used to burn gaseous fuel in a non premixed mode, as described above. As in the non premixed gaseous fuel combustion case, the oxidant stream is confined within two shear layer at its inside and outside boundaries. In the inside shear layer, the oxidant mixes with the injected liquid fuel stream. In the process, liquid fuel is entrained into the shear layer where it is heated by the air stream. This heating evaporates the liquid fuel and generates fuel vapor that mixes with the oxidant to form a combustible mixture. In the outer shear layer, the oxidant mixes with the counter flowing stream of hot combustion products and reacting gas pockets. The resulting fuel-oxidant mixture that is formed in the inner shear layer is ignited and burned in essentially premixed mode of combustion when it comes into contact with the mixture of oxidant-hot combustion products-reacting gas pockets mixture that formed in the outer shear layer.

Figure 4:
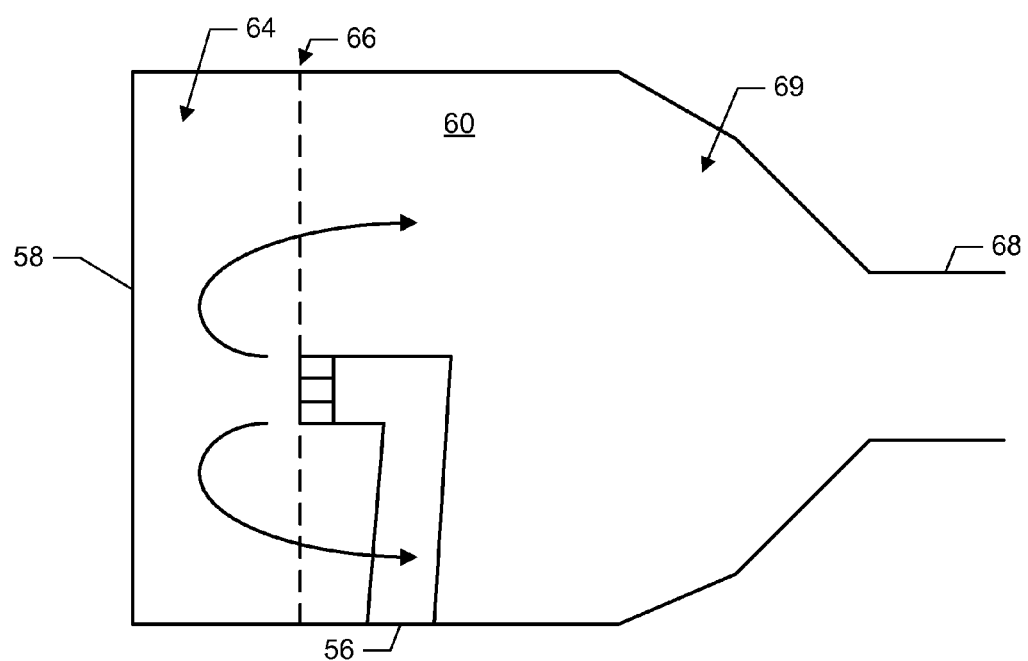
FIG. 4 illustrates a prospective view of a combustion method according to the present invention.

FIG. 4 illustrates a utilization of the combustion system when applied to a jet engine. Fuel and oxidant are provided via source 56 and directed toward the closed end wall 58 of combustion chamber 60. The combustion products generated in the flame region in the stagnation zone 64 near the closed end wall 58, are forced by the closed wall 58 to reverse flow direction and move towards the combustor exhaust outlet 66. As shown in this embodiment, the combustor exhaust outlet 66 is defined as the point within the overall vessel which is proximate to the inlet position of the reactants 56. Hence, as shown in this embodiment, the combustion chamber itself may be part of a larger vessel. In the example as shown, the combustor is connected to a transition section 69 with an exhaust nozzle 68 which enables the combustion products to exit the combustor. This exit is to be distinguished from the combustion exhaust outlet 66 as utilized herein.

Figure 5A:
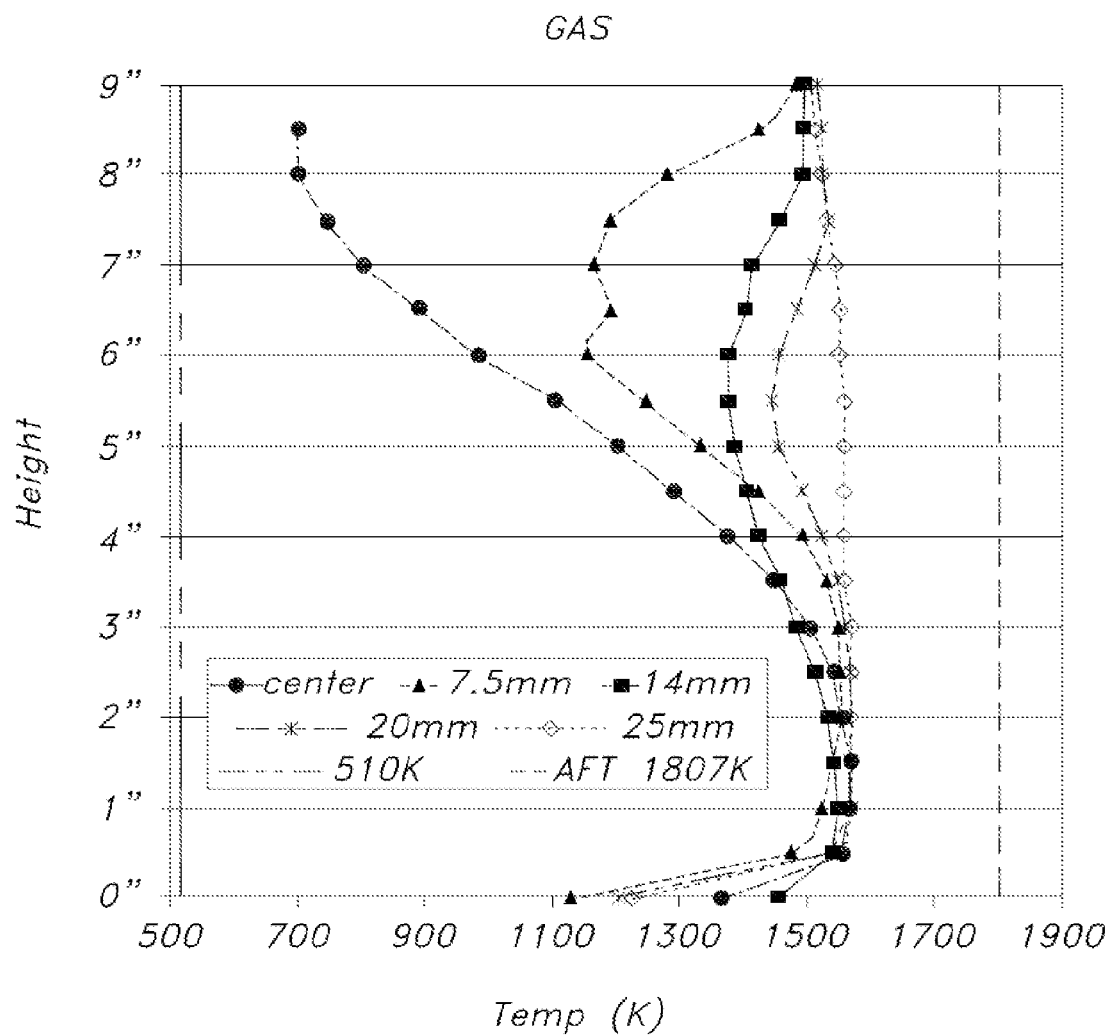
FIG. 5 shows measured temperature distribution illustrating one example of the present invention when burning gaseous fuel.
Figure 5B:
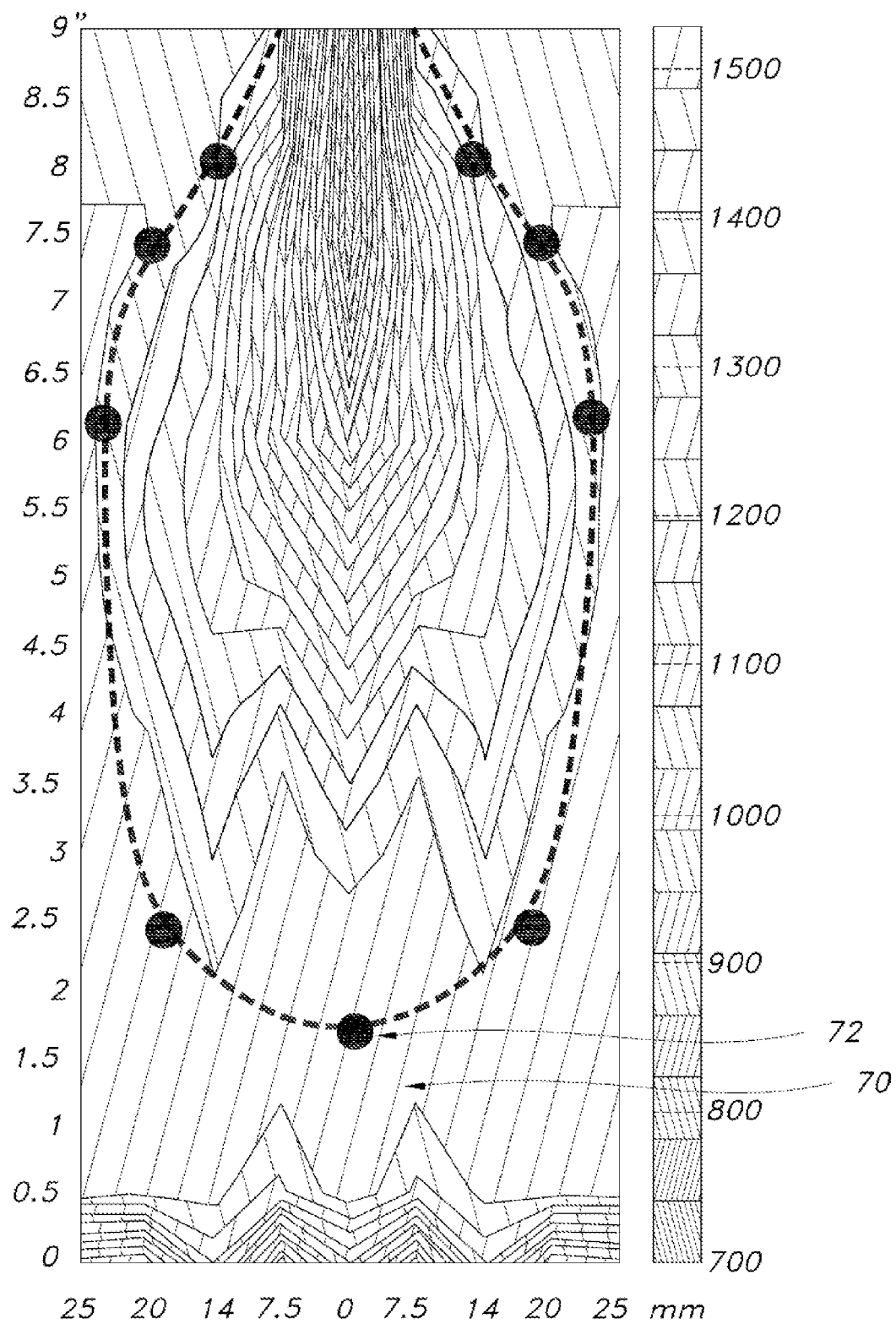
Figure 6A:
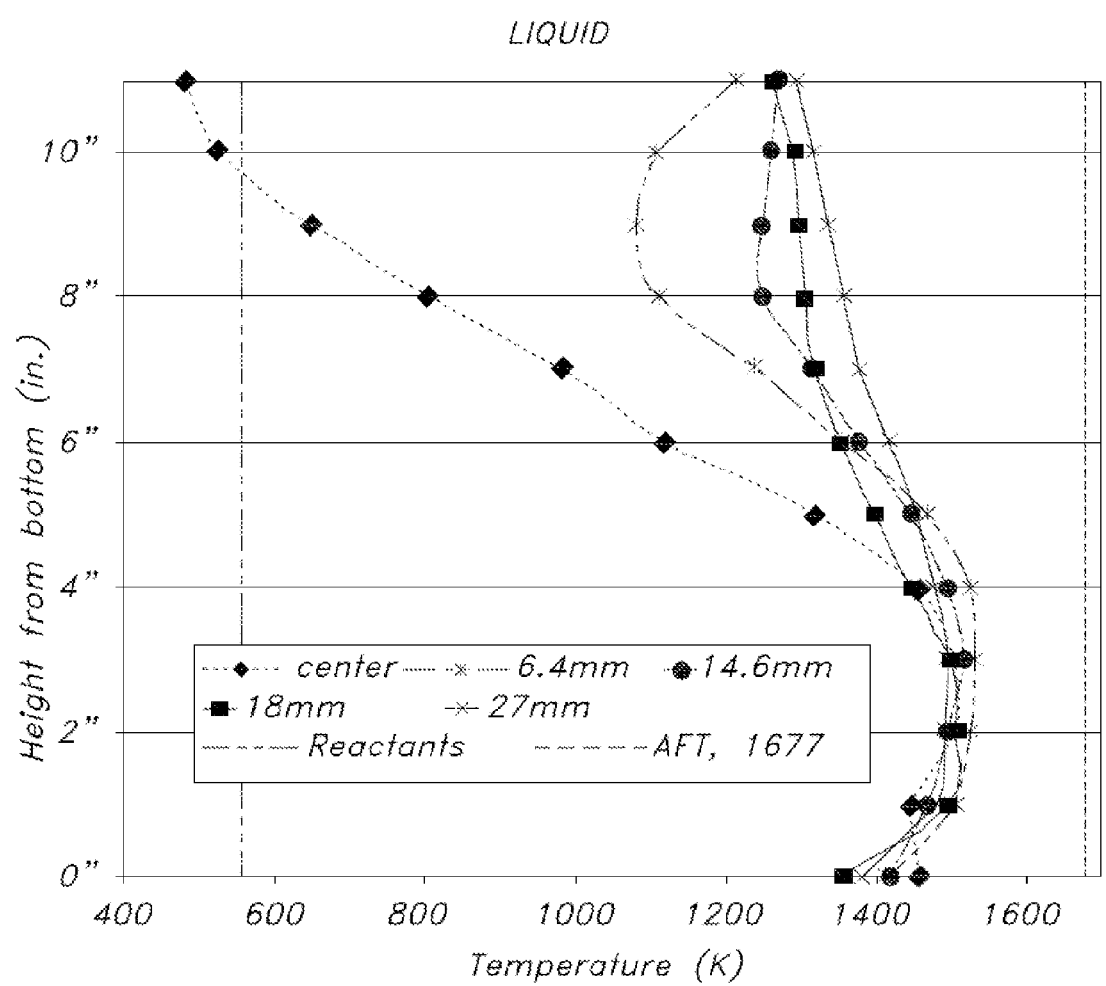
FIG. 6 shows measured temperature distribution illustrating one example of the present invention when burning liquid fuel.
Figure 6B:
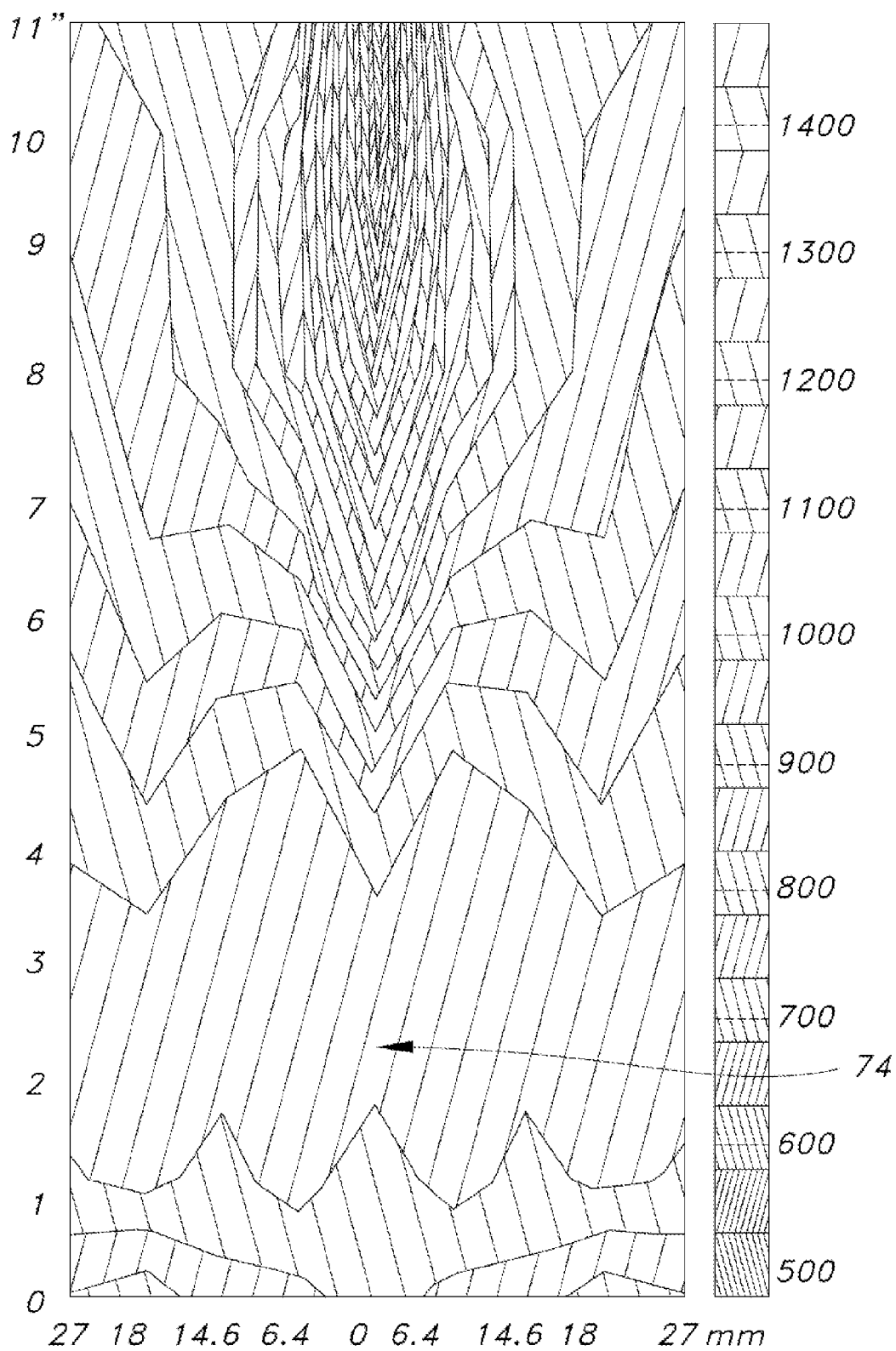

FIGS. 5 and 6 illustrate examples of measured average temperature distributions within the present invention. FIG. 5 shows the approximate shape of a flame created when gaseous fuel was burned in the present invention. A key feature of the present invention is the elimination of high temperature regions within the combustion chamber. By eliminating such high temperature regions, NOx emissions are minimized. As shown in FIG. 5, a section of the flame is stabilized in a location in the vicinity of the stagnation zone 70. Also, the average temperatures within the invented combustor are generally below 1800 degrees K. Since the invented combustion systems essentially burns gaseous and liquid fuels in a premixed mode of combustion, even if the fuel and oxidant are injected separately into the combustion chamber, the temperature of the resulting flame can be kept below the threshold value of 1800 K that produces NOx by controlling the amounts of oxidant and fuel supplied into the combustion chamber. When the overall air-fuel ratio is high, the resulting flame temperature is low, resulting in low NOx emissions.

FIG. 6 shows the average temperature distribution within the invented combustor for a particular example when burning a liquid fuel at an equivalence ratio of 0.48 and injected air velocity of 112 m/s. A stagnation zone between 74 and the wall was established providing a low velocity region near the distal wall where a section of the flame is stably anchored around line 74. Again, no high temperature regions are evident.

Figure 7:
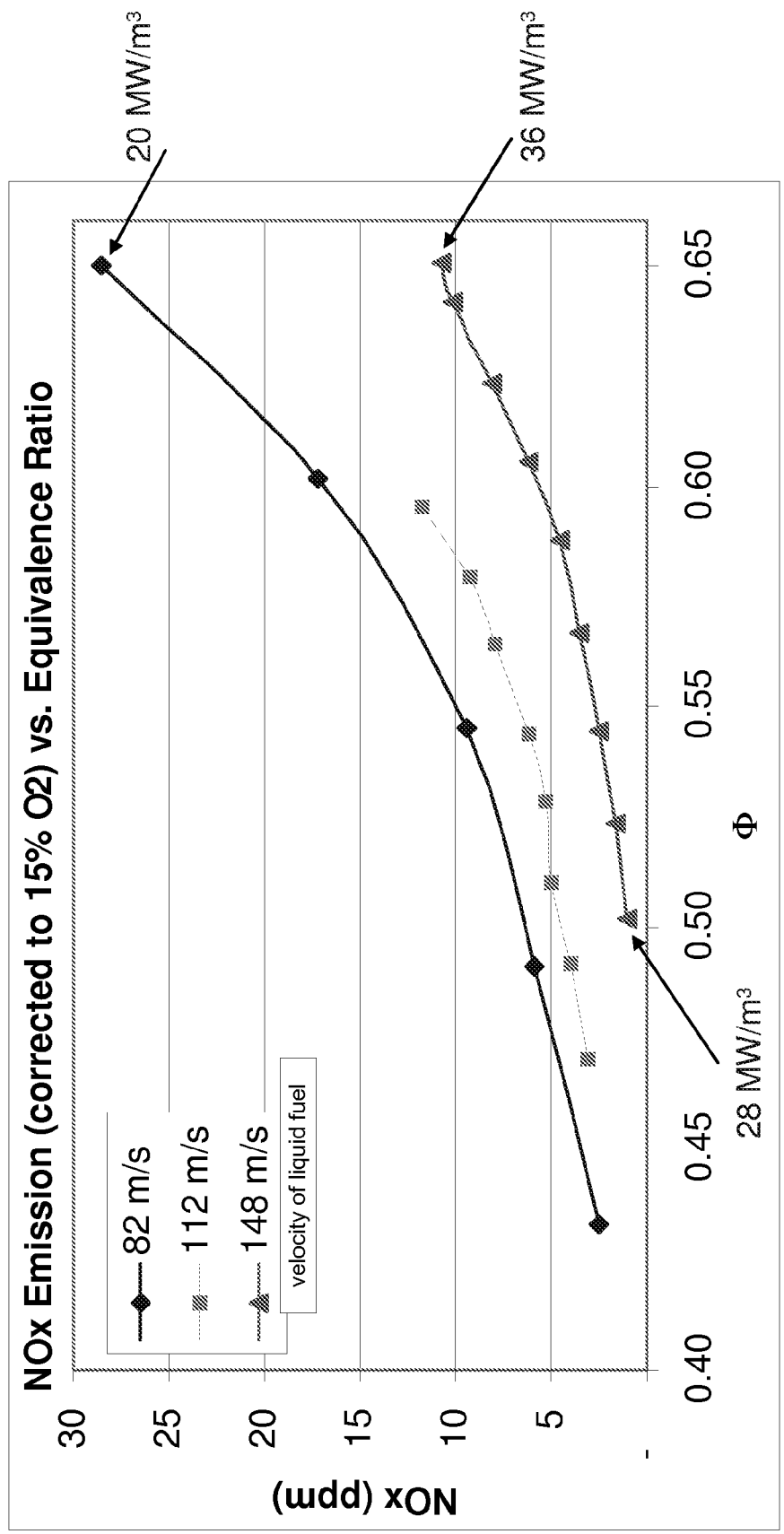
FIG. 7 illustrates NOx emissions and power densities of some examples of the present invention when burning a liquid fuel.

FIG. 7 illustrates the dependence of the NOx emissions within the combustion chamber shown in FIG. 1, when burning heptane liquid fuel in a non premixed mode of combustion, upon the injection air velocity and global equivalence ratio. As shown by the chart, the power density of the system increased as the equivalence ratio increased and the velocity of the oxidant increased. This chart illustrates that depending on the ultimate utilization of the combustion system of FIG. 1, NOx emissions as low as 1 part per million could be obtained with good power density or if more power or slower flow rates were desired the NOx emissions could still be maintained at low levels without changing the combustor size.

Figure 8:
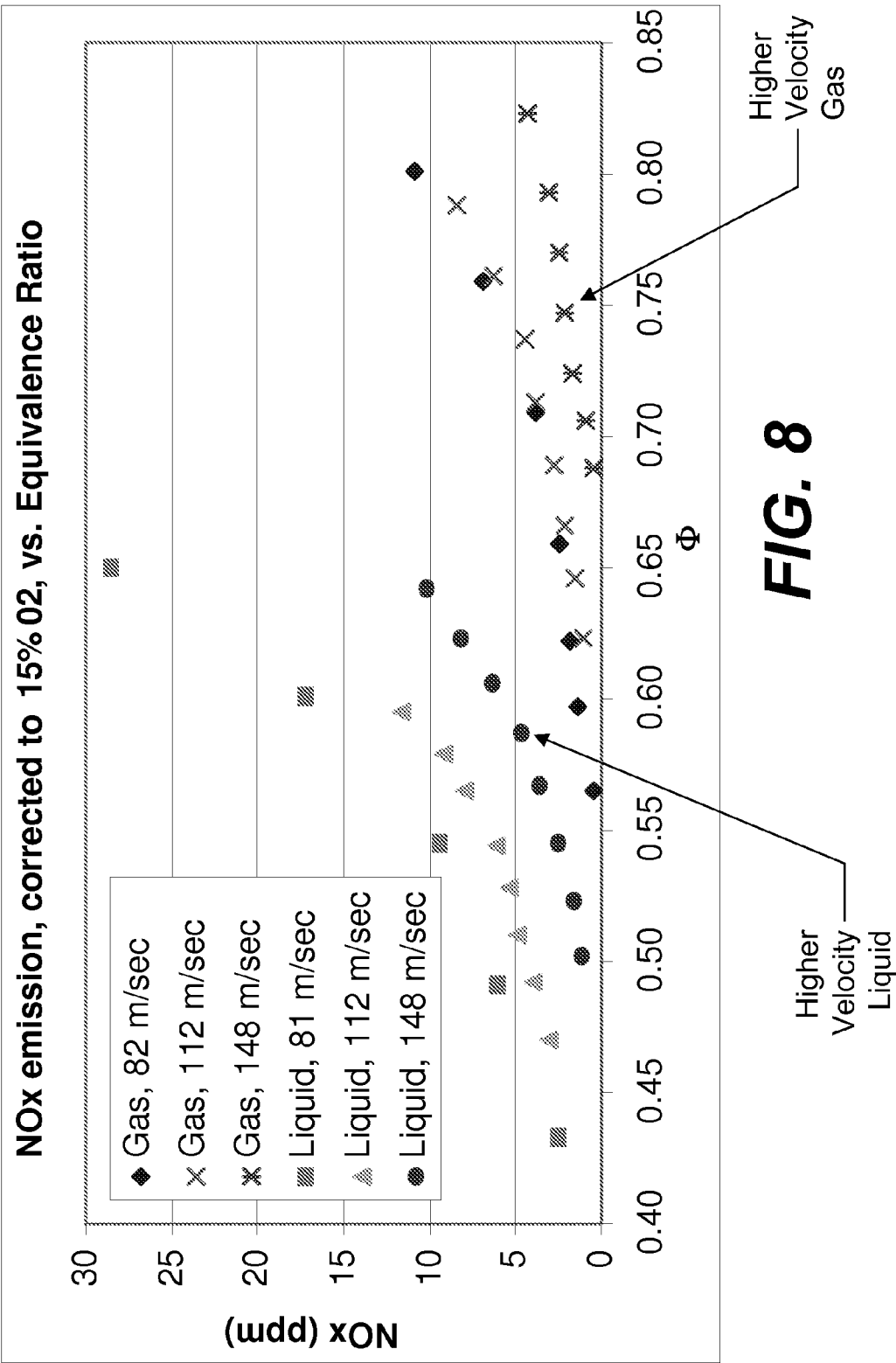
FIG. 8 illustrates NOx emissions of some examples of the present invention when burning gaseous and liquid fuels with various injection oxidant velocities and different equivalence ratios.
Figure 9:
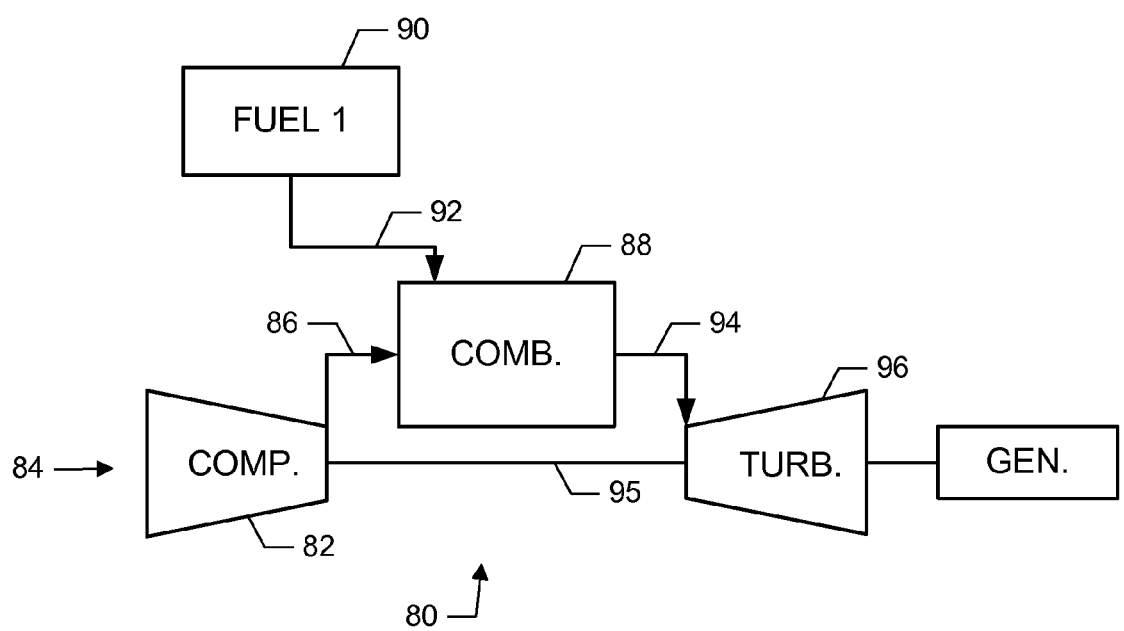
FIG. 9 is a prior art view of a gas turbine system.
Figure 10:
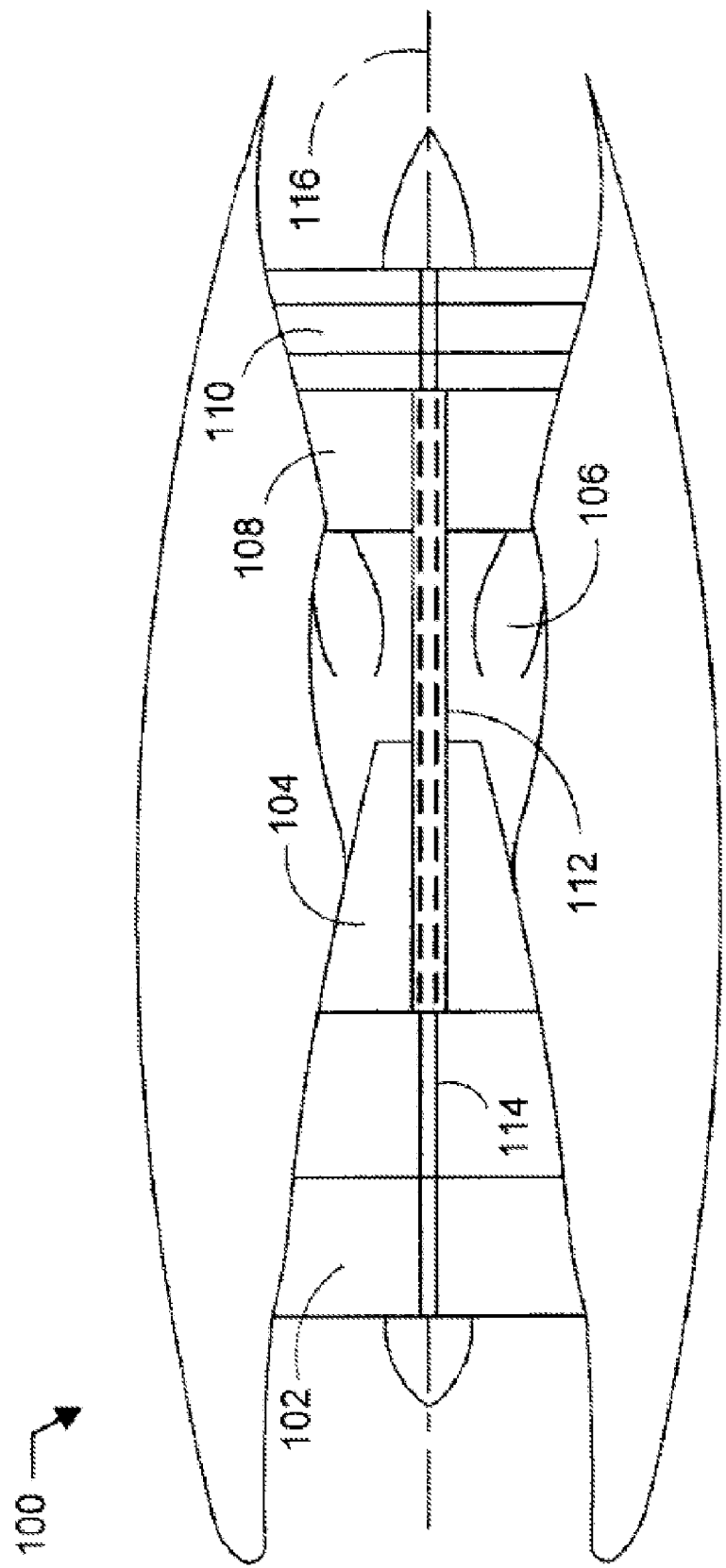
FIG. 10 is a prior art view of a jet engine.

FIG. 8 illustrates the results of multiple tests conducted utilizing the combustion system shown in FIGS. 1 and 3. The combustion system produced extremely low NOx emissions while burning gaseous and liquid over a wide range of reactants flow rates and equivalence ratios. Furthermore, since in this invention the generated fuel-air mixture is mixed with hot combustion products and radicals, such as O, OH and H, the combustor can be operated at low equivalence ratios, and thus low temperatures, reducing NOx emissions. In fact, FIGS. 7 and 8 illustrate that tests with the invented combustion system produced NOx emissions as low as 1 ppm at 15% $O_2$ when burning gases and liquid fuels in premixed and non premixed modes of combustion.

In operation as previously described, a method for combusting a fuel includes providing a vessel having an opened proximate end and a closed distal end defining a combustion chamber. A fuel and oxidant are presented into the combustion chamber. The fuel is ignited creating a flame and combustion products. The closed end of the combustion chamber is utilized for slowing the approaching flow, creating a stagnation region, and for redirecting combustion products toward the open end of the combustion chamber, thus creating a reverse flow of combustion products within the combustion chamber. The reverse flow of combustion products is intermixed with the oncoming reactants maintaining the flame. The utilization of a reverse flow of combustion products within the combustion chamber and the creation of a stagnation zone maintain a stable flame, even at low temperatures. In operation a power density of 100 MW/m$^3$ has been achieved.

Figure 11:
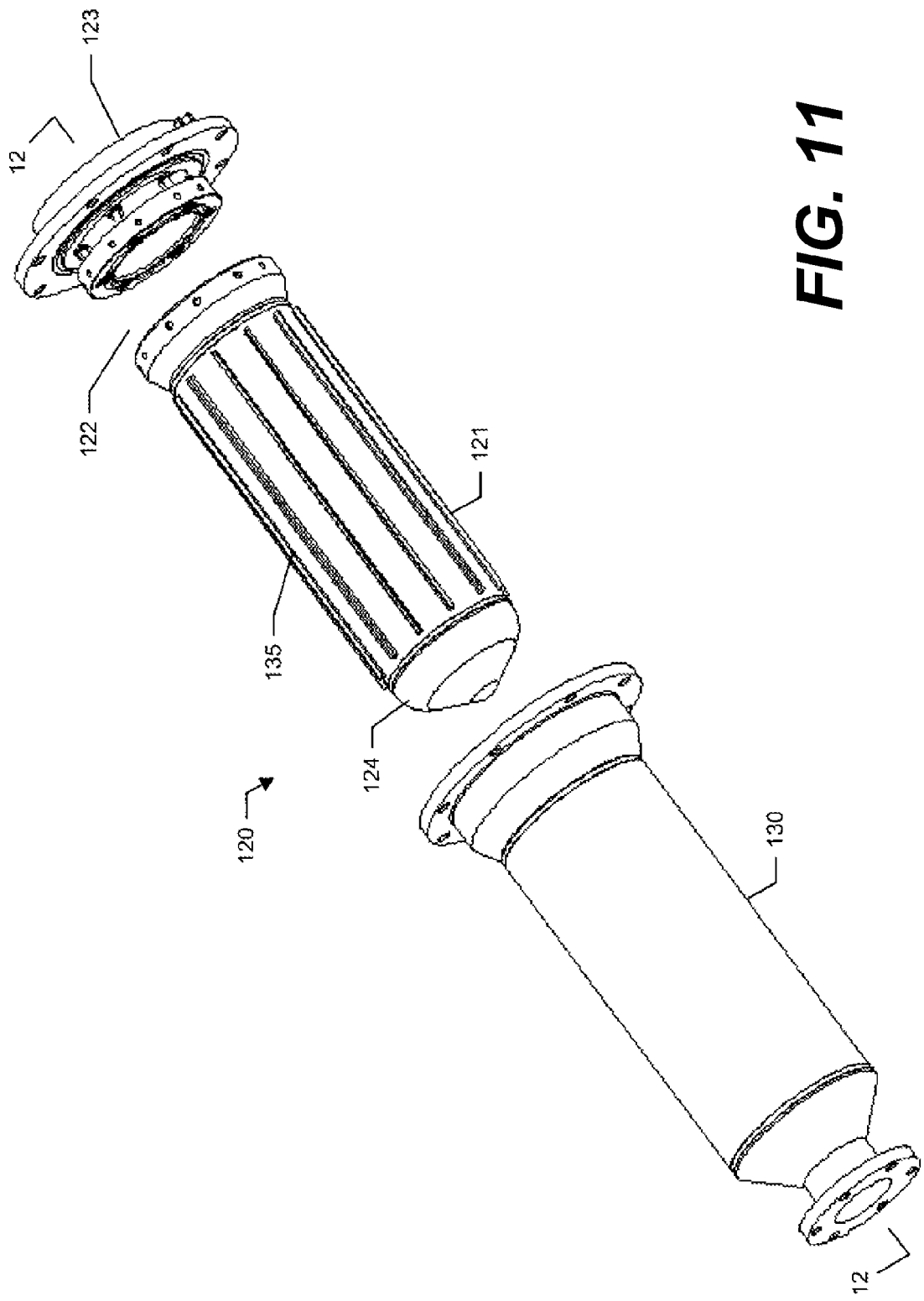
FIG. 11 illustrates an exploded view of a combustor assembly according to the present invention.
Figure 12:
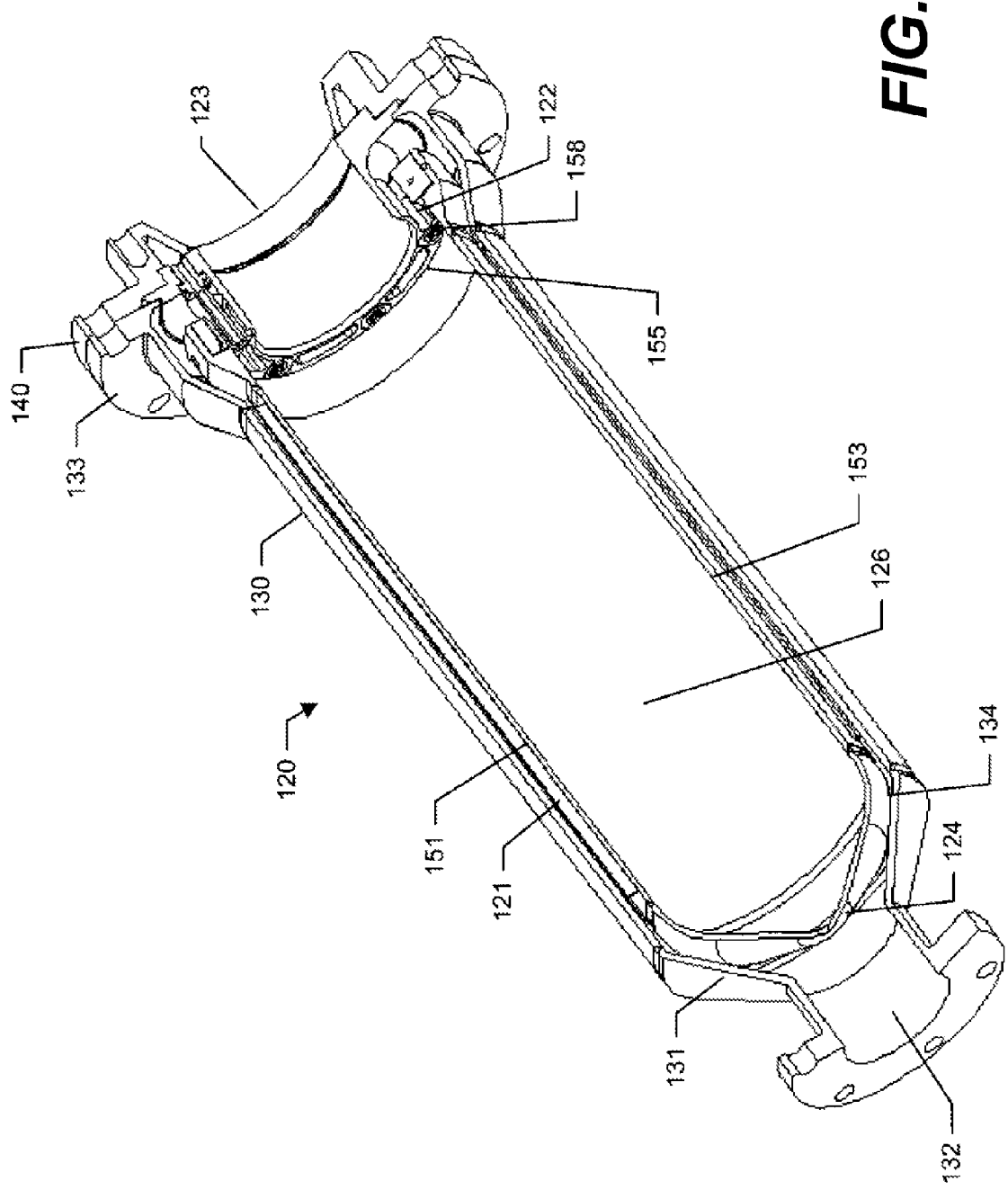
FIG. 12 illustrates a cut away view of a combustor assembly taken along line 12—12 of FIG. 11.
Figure 13:
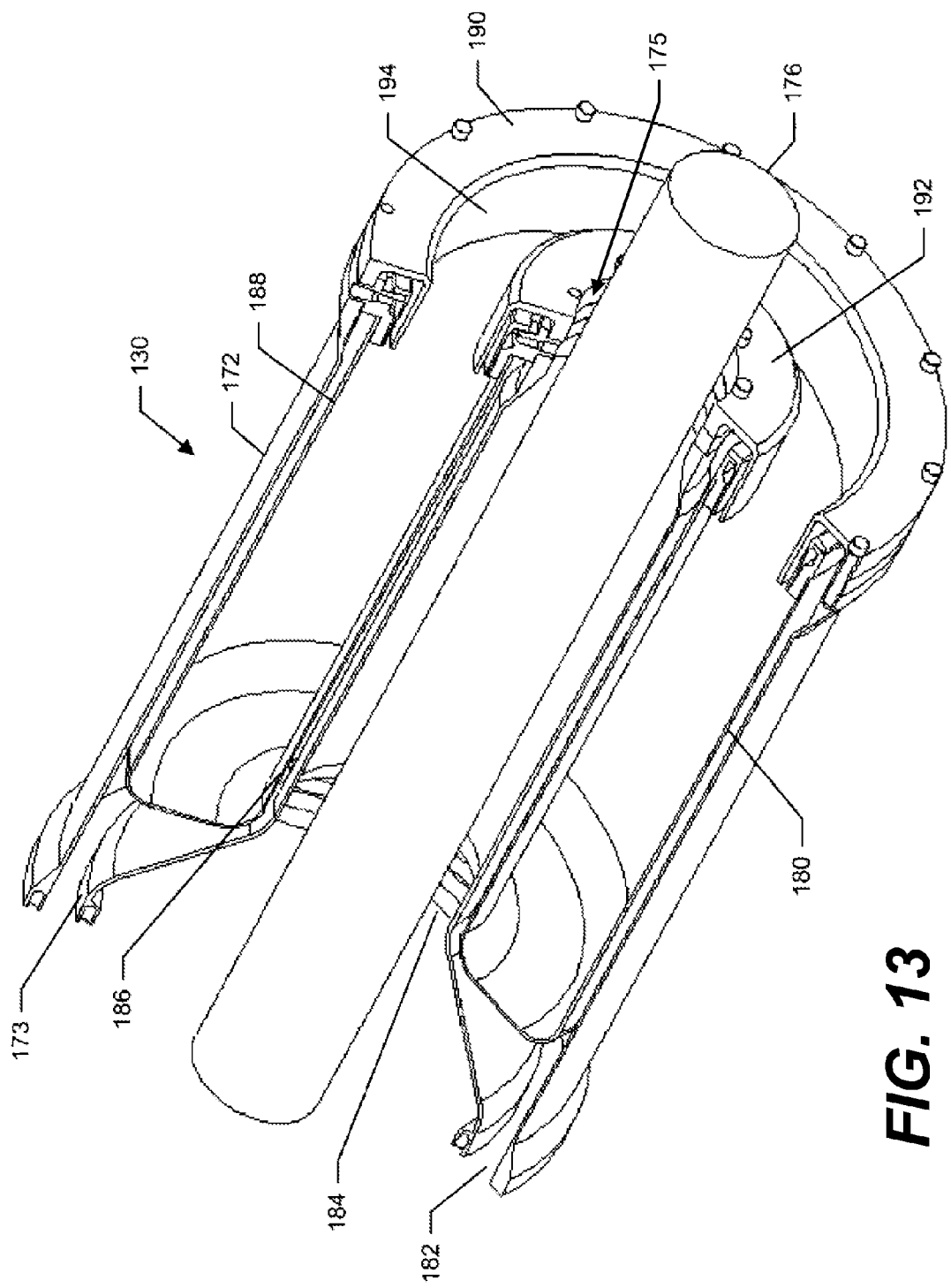
FIG. 13 illustrates a second embodiment of a combustor assembly according to the present invention.
Figure 14:
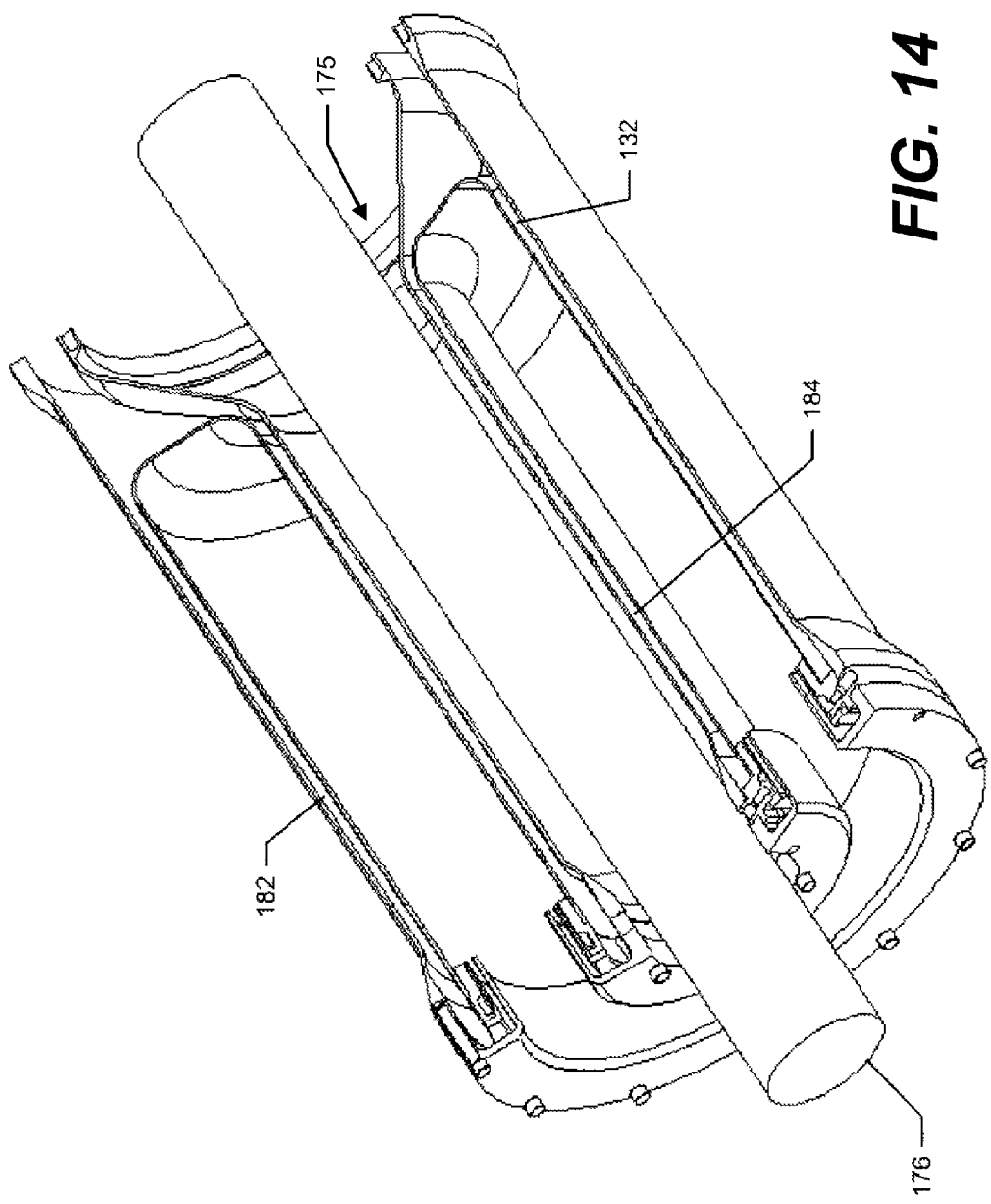
FIG. 14 illustrates a second embodiment of a combustor assembly according to the present invention.

FIGS. 11 and 12 illustrate a first embodiment of a combustor assembly 120 for implementing the above described technology into a combustion system such as a boiler or a gas turbine. FIGS. 13–17 illustrate a combustor assembly for use in a jet engine system. Combustor assembly 120 includes primary combustor vessel 121 which has a proximate end 122 and a distal closed end 124 defining a combustion chamber 126. Proximate end 122 may define combustion products exit opening 123. Combustion products exit opening 123 is preferably concentrically positioned within vessel 121. Reactants, which primarily are a fuel supply and an oxidant supply are provided into the combustion chamber for combustion. The fuel may be either in a gas or liquid state and the oxidant from an oxidant supplier which is preferably compressed air from a compressor but may be from any external source such as a fan. An igniter (not shown) ignites the reactants creating a flame and combustion products. Due to the geometry of primary combustor vessel 121, the incoming reactants flow, which initially flows toward the distal closed end, is reversed and the combustion products exit via combustion products exit 123.

As shown in FIG. 12, combustor assembly 120 includes combustor vessel 121, an outer casing or secondary housing 130 and an air-fuel manifold 140. Outer casing or secondary housing 130 includes an inner casing or secondary housing interior 131 which is preferably designed for matingly receiving combustor vessel 121. Outer casing or secondary housing interior 131 has a larger width than the outside width of combustor vessel 121. Outer casing or secondary housing 130 includes an air inlet 132 for receiving an oxidant supply from compressor, and a flanged lower periphery 133 for mating engagement with air fuel manifold 140. When combustor vessel 121 is received within outer casing or secondary housing interior 131, an air channel 134 is defined enabling air from the compressor to flow around combustor vessel 121. In the preferred embodiment, combustor vessel 121 includes cooling fins 135 which extend outward from the periphery of combustor vessel 121 into air channel 134. In the preferred embodiment, outer casing or secondary housing 130 and combustor vessel 121 are concentric. Outer casing or secondary housing 130 may also be a cylindrical sleeve enveloping combustor vessel 121.

Combustor vessel 121 includes a combustor outer wall portion 151 defining an outer periphery and a combustor interior wall portion 153 defining combustion chamber 126. Combustor vessel 121 is preferably cylindrical or a torus having proximate end 122 and distal closed end 124. In the preferred embodiment, an oxidant supply is provided by a compressor, and travels through air channel 134 over outer wall 151 and is directed into combustion chamber 126 via proximate end 122 via oxidant supply inlet 155. In this configuration the oxidant supply is utilized as a cooling agent for cooling the exterior walls of combustor vessel 121 and also enables the oxidant supply to be preheated.

Combustor assembly 120 includes fuel supply inlet 158 for directing fuel supply into combustion chamber 126. Fuel supply inlet 158 may be a nozzle if the fuel is a liquid. Fuel supply inlet 158 is positioned in the vicinity of proximate end 122 for providing fuel into combustion chamber 126 adjacent to oxidant supply inlet 155. In the preferred embodiment the relationship of the oxidant supply inlet and fuel supply inlet is such that the oxidant supply envelopes the fuel supply keeping the fuel removed from exiting combustion products until mixing with the oxidant. In operation, the mass of the oxidant is significantly greater than the mass of the fuel and the enveloping enables the fuel and oxidant to thoroughly mix prior to combusting. Hence, in operation, as the combustion products exit the combustion chamber along a central axis, the entering oxidant supply is positioned to flow between the exiting combustion products and the entering fuel supply preventing premature combustion of the fuel.

FIGS. 13–17 illustrate a second embodiment of the combustor assembly for use with a turbine system incorporating a shaft for driving a compressor. In this embodiment, outer casing or secondary housing 130 includes an outer sleeve 172 and an inner sleeve 173. Inner sleeve 173 is offset from outer sleeve 172 defining a combustor vessel cavity 174 for receiving combustor vessel 180. Internal sleeve 173 is preferably cylindrical having an interior defining a shaft channel 175 for receiving turbine compressor shaft 176. Combustor vessel 180 is preferably a torus. The torus configuration defines an interior wall 186 and an exterior wall 188 both having an interior portion and is positioned within combustor vessel cavity 174 such that an outer air channel 182 is defined between the exterior wall of combustor vessel 180 and outer sleeve 172 and an inner air channel 184 is defined between the interior wall of combustor vessel 180 and inner sleeve 173. Also air-fuel manifold consists of a first air-fuel manifold component 190 which is matingly attached to outer sleeve 172 and second air-fuel manifold component 192 which is matingly attached to inner sleeve 173. First air-fuel manifold component 190 is preferably annular defining a combustion products exhaust port 194 in conjunction with the open proximate end of the combustor vessel. Second air-fuel manifold component 192 is annular defining a turbine shaft channel. Second air-fuel manifold is preferably concentric with first air-fuel manifold component.

Figure 15:
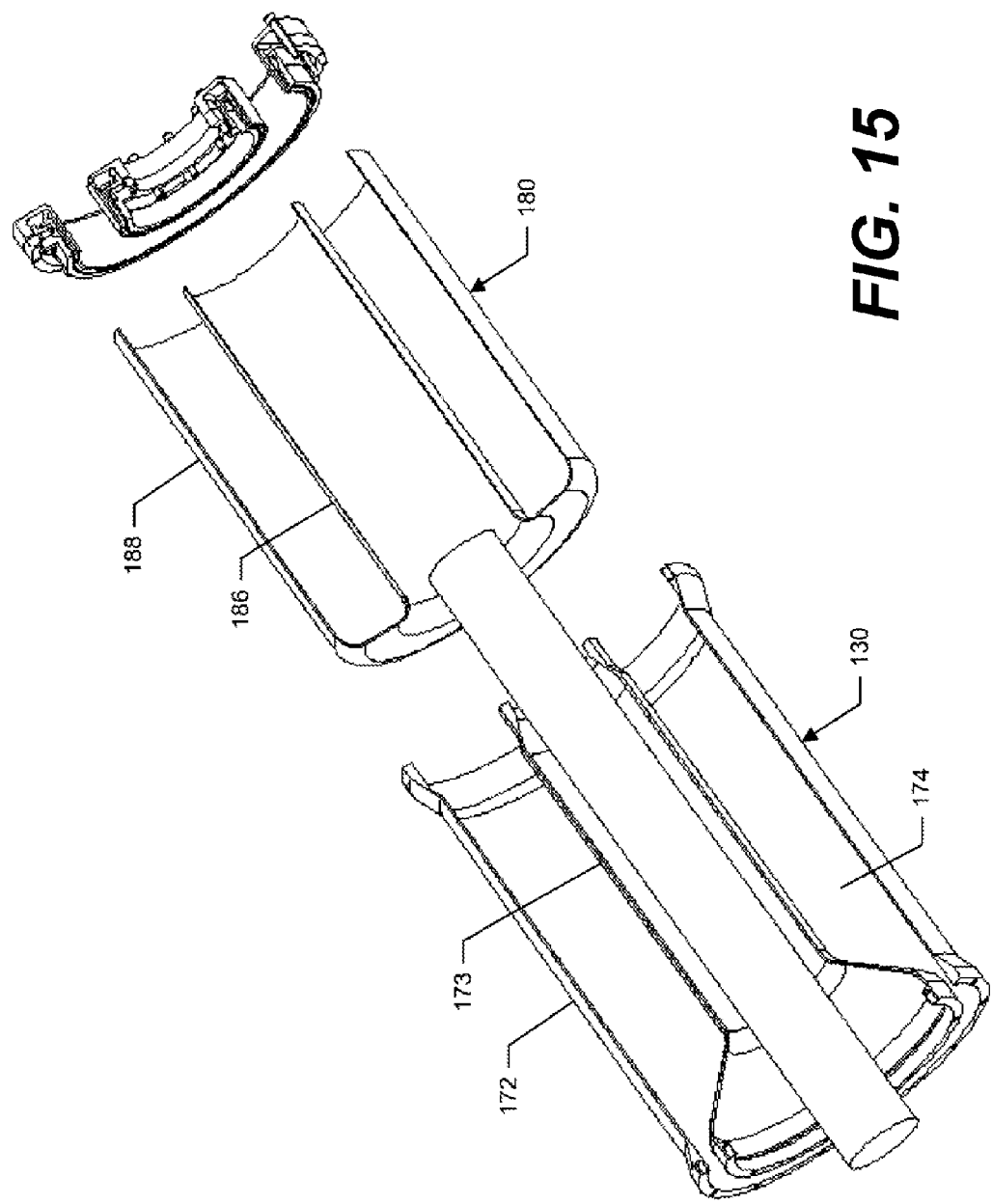
FIG. 15 illustrates an exploded view of a second embodiment of a combustion vessel.

FIG. 15 is an expoeded view of the combustor vessel 180 and secondary housing 130. Outer sleeve 172 and inner sleeve 173 define the combudtor vessel cavity 174 for receiving combustor vessel 180. Combustor vessel 180 is toroidal having interior wall 186 and exterior wall 188.

Figure 16:
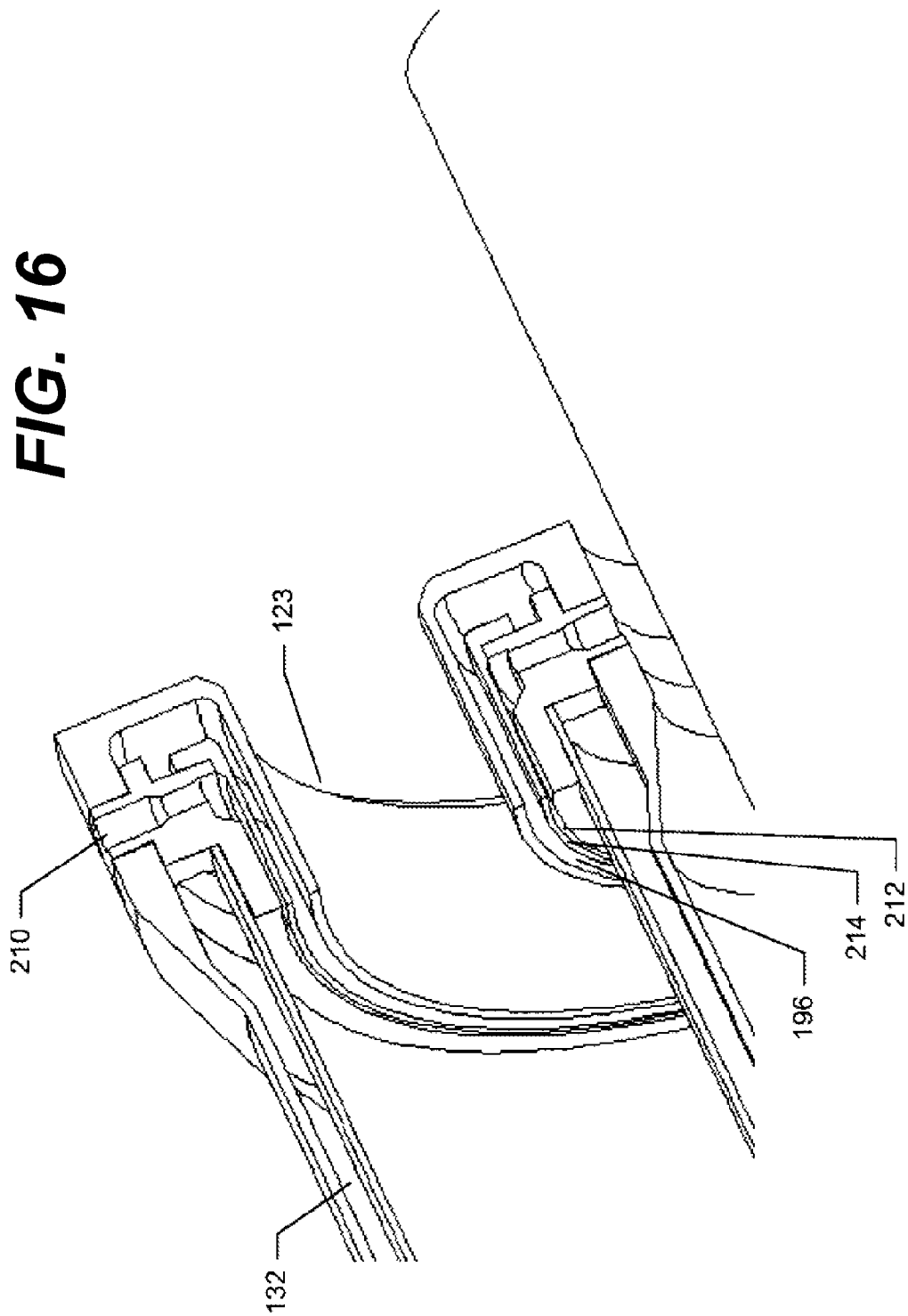
FIG. 16 illustrates a close up view of the interaction of the fuel and oxidant supply entering into the combustion vessel according to the present invention.
Figure 17:
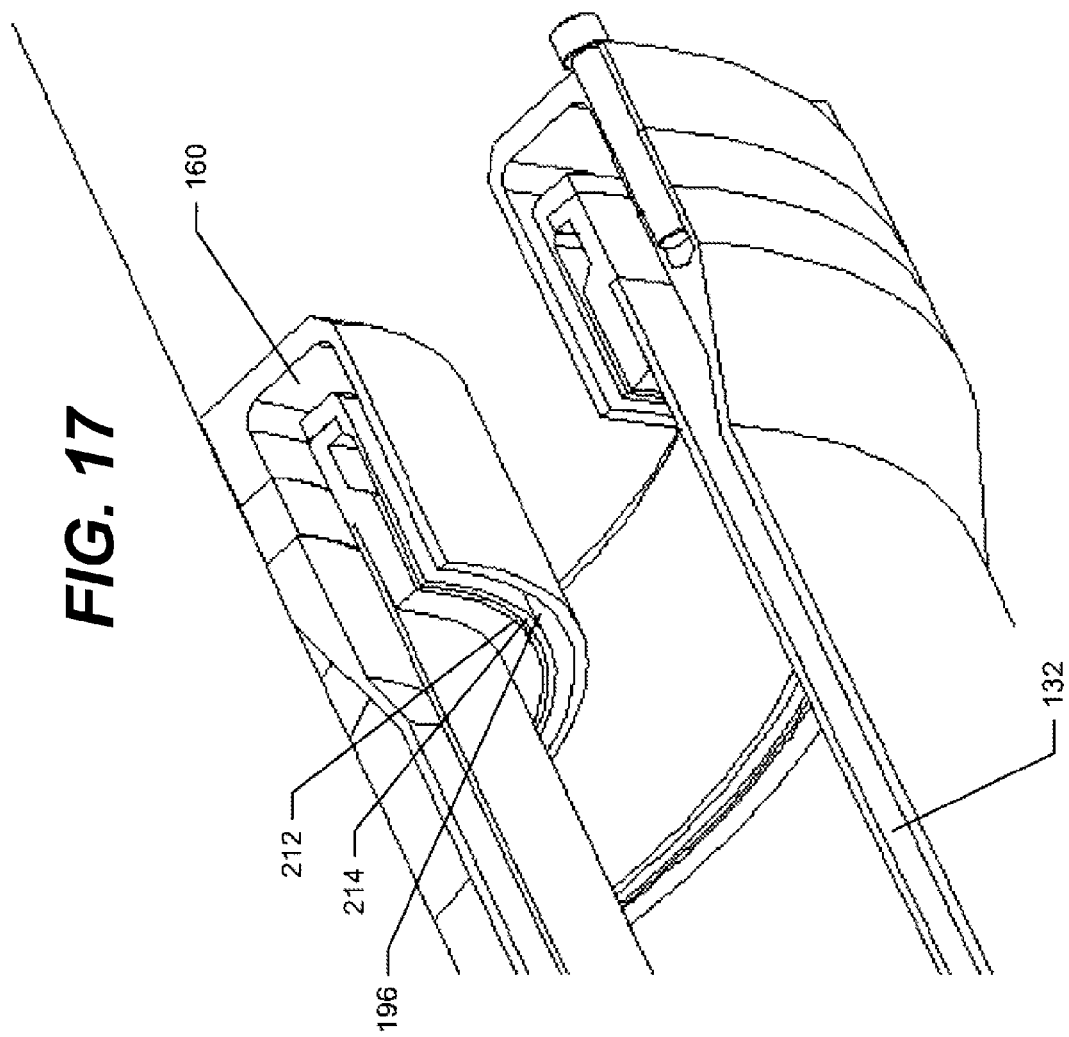
FIG. 17 illustrates another view of the interaction of fuel and oxidant supply entering into the combustion vessel according to the present invention.

FIGS. 16 and 17 illustrate a close up view of the oxidant and fuel supply passages and their interrelationship. Oxidant passage 132 defined by the spacing between the combustor vessel and the outer casing or secondary housing enables oxidant flow to pass over the exterior of the combustion vessel thereby providing cooling. The air is preferably provided by a compressor. The oxidant passage 132 is in fluid communication with manifold oxidant supply channel 160. Manifold oxidant supply channel redirects the flow of oxidant from being downstream along the exterior of the combustion vessel to upstream entering the combustion vessel in the open proximate end via oxidant outlet 196. Fuel inlet 210 is defined within the manifold for supplying a fuel supply to fuel outlets 212 which direct fuel into the combustion vessel. A fuel/air wall interface 214 separates oxidant outlet 196 from fuel outlets 212. In one embodiment, oxidant outlet 196 is an annular slit circumferentially located along the annular manifold. Also, in a similar embodiment, fuel outlet 212 is an annular slit circumferentially located along the annular manifold with the oxidant outlet 196 disposed between the fuel outlet 212 and combustion products exit 123. In this configuration, the oxidant and fuel are presented into the combustion vessel such that the oxidant supply envelopes the fuel separating the fuel from the exiting combustion products. With this separation, the fuel and oxidants are allowed to mix as they travel into the combustion chamber towards the closed distal end where they reach a region of low velocity where the downstream end of the flame is stabilized.

As shown in FIG. 11, air-fuel manifold 140 is preferably annular having a combustor facing surface received within the proximate end of the combustor vessel. The manifold includes a central void which in conjunction with the open proximate end defines combustion products exit 123. Preferably combustion products exit is axially aligned with a portion of the closed distal end. The manifold carries a plurality of combustible reactant ports for directing combustible reactants into the combustion vessel from the region of the proximate end towards the closed distal end. If the fuel and oxidant are pre-mixed, then the pre-mixed combustible reactants are dispersed through the combustible reactant ports. In some configurations, the oxidant and fuel are supplied separately.

The relationship of combustion products exit 123 and the combustible reactants ports is important. By directing the combustible reactants from the proximate open end towards the closed distal end, the combustible reactants reach a position of low velocity near the closed distal end. Also, shear layers are created between the combustible reactants and the out flowing combustion products. In the toroid configuration, the manifold includes an outer annular ring having a first plurality of combustible reactant inlets, and an interior manifold member having a second plurality of combustible reactants inlets which are positioned in the proximity of the interior wall of the combustion vessel. In these configurations, combustible reactants are presented to the combustion chamber in two distinct upstream flowing streams which separate the interior walls of the inner and outer combustion walls from the outflowing of combustion products. The combustible reactant inlets may include a first set of inlets for oxidants and a second set for fuel if the combustible reactants are not premixed.

Figure 18:
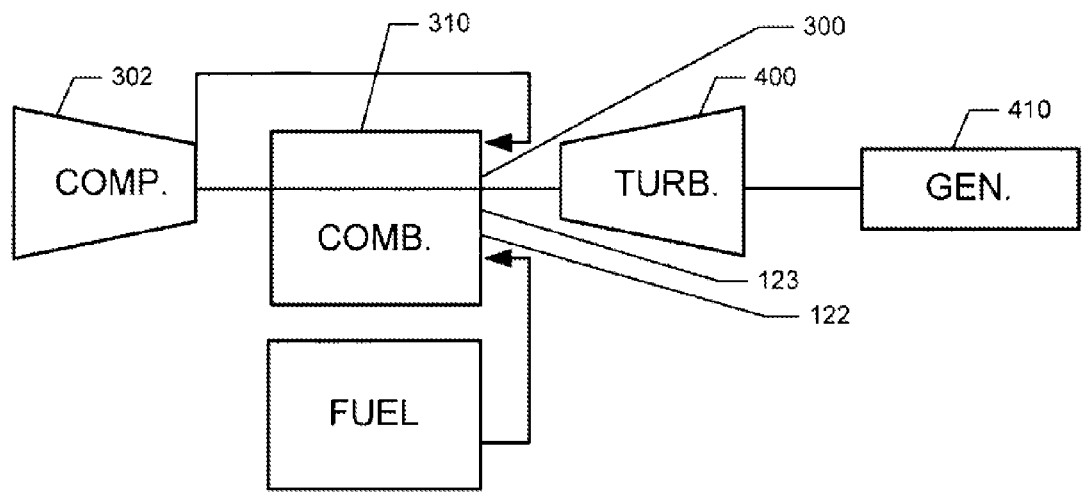
FIG. 18 illustrates a schematic of a gas turbine design of the present invention.
Figure 19:
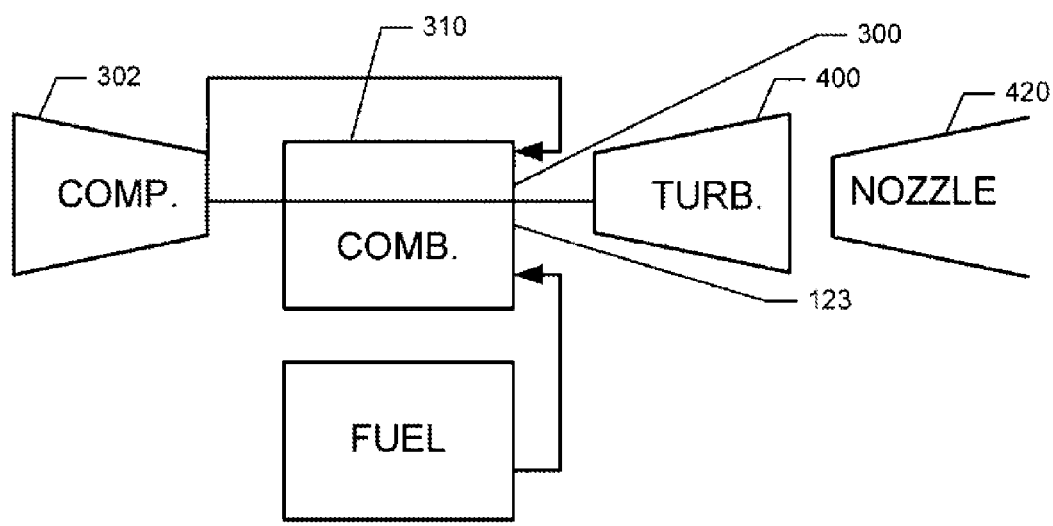
FIG. 19 illustrates a schematic of a jet engine design of the present invention.
Figure 20:
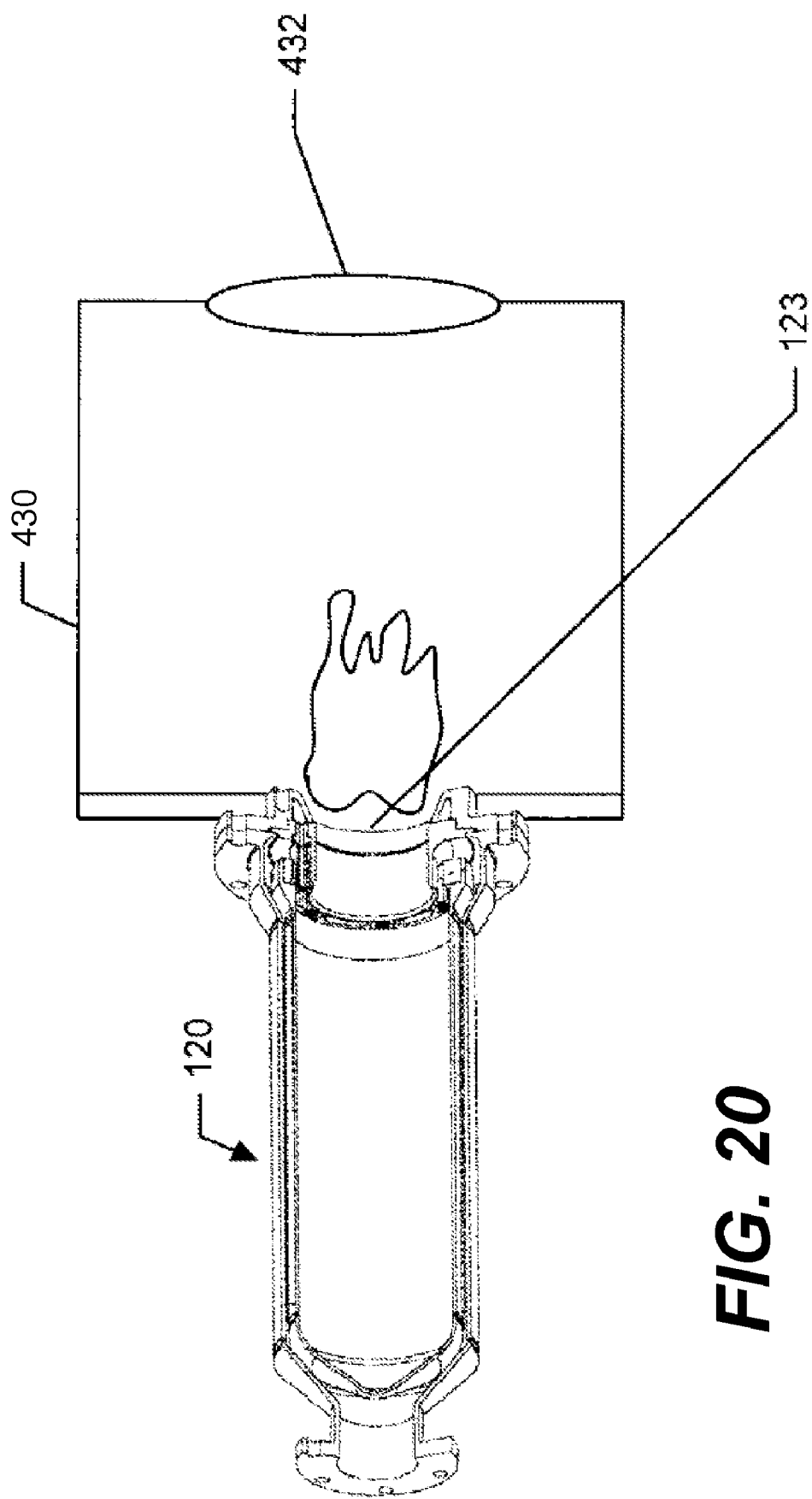
FIG. 20 illustrates a schematic of a boiler design of the present invention.

The design of the combustor assembly is suitable for gas turbines as shown in FIG. 18, jet engines as shown in FIG. 19, and boilers as shown in FIG. 20. As shown in FIGS. 18, 19, and 20, the combustor assembly is positioned with the closed distal end in the direction of the compressor. The air inlet of combustor assembly 300 receives compressed air from compressor 302. The air travels along the exterior wall 310 of the combustor vessel cooling the exterior wall and also preheating the compressed air. The air and fuel are presented to the combustor vessel in the vicinity of the combustor vessel's open end 122 which defines a combustion product exhaust port. The combustion products exit opening 123 is in the vicinity of the system's turbine or turbines 400 and is positioned in the direction of the turbines. The air and fuel reach a point of low velocity within the combustor vessel due to the closed distal wall of the combustor vessel where a fraction of the fuel is burned. This combustion is initiated by the interaction of the air and fuel with the combustion products which are exiting via the combustion product exit opening toward the turbine. By directing the oxidant supply over the exterior portion of the combustor vessel, the combustor vessel is cooled and the oxidant supply is preheated. For a gas turbine system, a generator 410 is driven, for a jet engine the hot product gases pass through a nozzle 420.

As shown in FIG. 20 with respect to boilers, the combustion vessel 120 is located outside a central boiler 430 and the combustion reactants are introduced into the boiler from the combustion vessel. An exit flue 432 is provided for exhausting the gases.

The advantages provided by the combustion system are capabilities to burn gaseous and liquid fuels with an oxidant in either premixed or non-premixed modes of combustion with high stability, high combustion efficiency, low NOx and CO emissions over a wide range of supply fuel air ratios, pressure and temperature, and high power densities. Such a combustion system design is especially suitable for gas turbines, jet engines and boilers.

This invention is using the geometrical arrangement of the combustion system to establish the feedback between incoming reactants and out flowing hot combustion products that ignites the reactants over a wide range of fuel flow rates while keeping emissions of NOx, CO, UHC and soot below mandated government limits.

We claim:

1. A combustor assembly for receiving an oxidant supply from an oxidant supplier comprising:
   - a combustor vessel having an outer wall, a proximate end defining an opening and a closed distal end opposite said proximate end;
   - said combustor vessel outer wall being continuous from a point at least midway between said opening and said closed distal end to said distal end defining a combustor chamber;
   - a sleeve encircling the outer wall of said combustor vessel;
   - said sleeve being offset from said wall of said combustor vessel defining an oxidant supply channel for directing an oxidant supply received from the compressor along the outer wall of said combustor vessel;
   - an oxidant supply port in fluid communication with said oxidant supply channel for directing an oxidant supply into said combustor vessel from the region of said proximate end towards said closed distal end;
   - a manifold carried by the proximate end of said combustor vessel, said manifold having an annular configuration defining a combustion products exit, said combustion products exit being axially aligned with a portion of said closed distal end;
   - a plurality of combustible reactant ports carried by said manifold for directing combustible reactants into said combustion vessel from the region of said proximate end towards said closed distal end;
   - said combustible reactant ports include at least an oxidant port and a fuel port; and
   - at least one oxidant port is intermediary said fuel port and said combustion products exit shielding fuel from said fuel port from combustion products exiting said combustion chamber via said combustion products exit.

2. The combustor assembly of claim 1 wherein combustible reactants port include a first set of oxidant ports and second set of fuel ports alternately positioned within said manifold.

3. The combustor assembly of claim 2 wherein said manifold includes a combustor facing surface received within said proximate end, and said first and second set of ports are alternately positioned circumferentially along the entire combustor facing surface.

4. The combustor assembly of claim 1 wherein said combustor vessel has a torus cross-section having an outer wall having an internal and external surface and an inner wall having an internal and external surface.

5. The combustor assembly of claim 4 further including a plurality of fuel supply ports for directing fuel supply from said proximate end towards said closed distal end along the internal surface of said inner and outer wall of said combustor vessel.

6. The combustor assembly of claim 5 further including a plurality of oxidant supply ports for directing oxidant supply from said proximate end towards said closed distal end adjacent to fuel stream flowing along the internal surface of said inner and outer wall of said combustor vessel.

7. The combustor assembly of claim 4 further including an inner sleeve received within the combustor vessel offset from the external surface of said inner wall, said inner sleeve and inner wall defining an inner oxidant supply channel for directing an oxidant supply from the compressor along the external surface of said inner wall for cooling said external surface.

* * * * *